United States Patent
Ohtake

(10) Patent No.: US 7,286,304 B1
(45) Date of Patent: Oct. 23, 2007

(54) VARIABLE FOCAL LENGTH LENS SYSTEM AND IMAGING APPARATUS

(75) Inventor: Motoyuki Ohtake, Saitama (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/783,797

(22) Filed: Apr. 12, 2007

(30) Foreign Application Priority Data

Apr. 25, 2006 (JP) ............................. 2006-120319

(51) Int. Cl.
*G02B 9/34* (2006.01)

(52) U.S. Cl. ...................... 359/774; 359/687; 359/686; 359/772

(58) Field of Classification Search ................ 359/774, 359/772, 771, 769, 758, 759, 687, 686
See application file for complete search history.

(56) References Cited

U.S. PATENT DOCUMENTS 7,206,137 B2 * 4/2007 Nakatani et al. ............ 359/687

FOREIGN PATENT DOCUMENTS

| JP | 2003-295059 | 10/2003 |
| JP | 2005-128186 | 5/2005 |
| JP | 2005-215385 | 8/2005 |

\* cited by examiner

*Primary Examiner*—Timothy Thompson
(74) *Attorney, Agent, or Firm*—Rader Fishman & Grauer PLLC; Ronald P. Kananen

(57) ABSTRACT

A variable focal length lens system includes: a first lens group having a positive refractive power; a second lens group having a negative refractive power; a third lens group having a positive refractive power; and a fourth lens group having a positive refractive power. As the lens position state changes from a wide-angle end state to a telephoto end state, at least each of the lens groups is mobile, the second lens group moves towards the image side and the third lens group moves towards the object side such that the gap between the first and the second lens group increases, and the gap between the second and the third lens group decreases, while the fourth lens group moves in the direction of the optical axis so as to compensate for changes in the position of the image plane which accompany movements of each of the lens group.

12 Claims, 27 Drawing Sheets

VARIABLE FOCAL LENGTH LENS SYSTEM AND IMAGING APPARATUS

CROSS REFERENCES TO RELATED APPLICATIONS

The present application contains subject matter related to Japanese Patent Application JP 2006-120319 filed in the Japanese Patent Office on Apr. 25, 2006, the entire content of which being incorporated herein by reference.

BACKGROUND OF THE INVENTION

1. Field of the Invention

The present invention relates to a new variable focal length lens system and imaging apparatus. More specifically, the present invention relates to a variable focal length lens system whose zoom ratio exceeds 10× and that is used in video cameras, digital still cameras and the like, as well as to an imaging apparatus equipped with the above-mentioned variable focal length lens system.

2. Description of Related Art

There is known a method of recording a subject image, which is formed by an imaging device, as a recording means in a camera, using such photoelectric transducers as CCDs (Charge Coupled Devices) or CMOSs (Complementary Metal-Oxide Semiconductors) and formed on the plane of the imaging device, by converting the light intensity of the subject image into an electric output by way of each photoelectric transducer.

Along with the advancement in microfabrication technology in recent years, central processing units have become faster and storage media have witnessed higher integration. As a result it has become possible to process large volumes of image data, which could not be handled before, at high speeds. In addition, imaging devices have become more highly integrated and much smaller, and higher levels of integration have made recording at higher spatial frequencies possible, while their smaller sizes have brought about reductions in the overall size of cameras.

However, the above-mentioned integration and miniaturization result in a smaller light reception area for each photoelectric transducer, thereby causing a drop in the electric output which is accompanied by an increase in noise. In order to counter this issue, such attempts as increasing the light intensity that reaches the imaging device by magnifying the focal ratio of an optical system or placing small lens elements (referred to as micro lens arrays) right in front each photoelectric transducer have been made. While the above-mentioned micro lens arrays do guide beams of light that fall between adjacent photoelectric transducers onto the photoelectric transducers, they limit the positioning of the exit pupil in the lens system. In other words, as the exit pupil in the lens system approaches the imaging device, that is, as the angle between the chief ray reaching the imaging device and the optical axis become greater, off-axis light beams directed towards the periphery of the screen form greater angles with respect to the optical axis, and as a result, they do not reach the photoelectric transducers, and cause insufficient light intensity.

In recent years, as digital cameras have become more popular, users' needs have also become more diverse.

Zoom lenses that have a zoom ratio exceeding 10× are capable of capturing a subject in larger sizes. In particular, since cameras with integrated lenses cannot have their lenses changed, users of such cameras desire greater zoom ratios even if it means they have to settle for larger cameras.

As zoom lenses with zoom ratios exceeding 10×, those, for example, disclosed in Japanese Patent Application Publication Nos. 2005-215385 (Patent Document 1), 2003-295059 (Patent Document 2), 2005-128186 (Patent Document 3) and the like are known.

The zoom lenses disclosed in Patent Document 1 and Patent Document 2 include four lens groups, which are, in order and from the side of the object, a first lens group having a positive refractive power, a second lens group having a negative refractive power, a third lens group having a positive refractive power, and a fourth lens group having a positive refractive power. The four lens groups are so configured that when the lens position state changes from a wide-angle end state to a telephoto end state, the first lens group moves towards the object, the second lens group moves towards the image, the third lens group moves towards the image after first moving towards the object, and the fourth lens groups moves towards the image after first moving towards the object. In addition, the zoom lens disclosed in Patent Document 1 is so configured that an aperture stop placed between the second lens group and the third lens group moves independently of the other lens groups.

The zoom lens disclosed in Patent Document 3 includes four lens groups, a first lens group having a positive refractive power, a second lens group having a negative refractive power, a third lens group having a positive refractive power, and a fourth lens group having a positive refractive power. These lens groups are so configured that when the lens position state changes from the wide-angle end state to the telephoto end state, the first lens group and the third lens group are fixed in the direction of the optical axis, the second lens group moves towards the image, and the fourth lens group moves so as to compensate for changes in the position of the plane of the image that accompany the movement of the second lens group.

SUMMARY OF THE INVENTION

However, there is an issue with the above-mentioned zoom lenses of related art in that, since the zooming function centers on the second lens group, performance is compromised if the second lens group is misaligned even by the smallest amount at the time of manufacture.

In the zoom lens disclosed in the above-mentioned Patent Document 1, the second lens group includes three single lenses. Since the positive spherical aberration that occurs at the second lens group is corrected by the image-side lens surface of a second negative lens of the second lens group and the object-side lens surface of a positive lens located on the image-side of the above-mentioned negative lens, performance is easily compromised if the above-mentioned two lens surfaces are misaligned.

The second lens group of the zoom lenses disclosed in Patent Document 2 and Patent Document 3 includes, in order and from the side of the object, a first negative lens, a second negative lens, and a cemented lens of a positive lens and a negative lens. As a result, it is possible to weaken the refractive power of the image-side lens surface of the second negative lens, thereby reducing performance degradation caused by a misalignment between the second negative lens and the cemented lens.

However, in the zoom lenses disclosed in Patent Document 2 and Patent Document 3, there is an issue in that the diameter of the first lens group becomes bigger due to the fact that there are many lenses in the second lens group which causes the second lens group to be thicker.

Accordingly, it is desirable to provide a variable focal length lens system that achieves a high zoom ratio as well as miniaturization, and an imaging apparatus using such a variable focal length lens system. The present invention addresses the issues above.

A variable focal length lens system according to an embodiment of the present invention includes, in order and from the side of the object, a first lens group having a positive refractive power, a second lens group having a negative refractive power, a third lens group having a positive refractive power, and a fourth lens group having a positive refractive power. When the lens position state changes from a wide-angle end state, where the focal length is shortest, to a telephoto end state, where the focal length is greatest, at least each of the lens groups from the above-mentioned first lens group to the above-mentioned fourth lens group is mobile, and the above-mentioned second lens group moves towards the image while the above-mentioned third lens group moves towards the object so that the gap between the above-mentioned first lens group and the above-mentioned second lens group grows bigger, while the gap between the above-mentioned second lens group and the above-mentioned third lens group becomes smaller. At the same time, the above-mentioned fourth lens group moves in the direction of the optical axis in order to compensate for the change in the position of the plane of the image that accompanies the movement of each of the lens groups. The above-mentioned first lens group is positioned closer to the object in the telephoto end state as compared to the wide-angle end state. The second lens group includes, in order and from the side of the object, a negative lens, which is of a meniscus shape and which has a concave surface and an aspherical surface on the image side, and a cemented negative lens, which is of a biconcave lens and a positive lens of a meniscus shape that has its convex surface facing the object. Assuming f2a is the focal length of the negative lens placed in the second lens group, f2B the focal length of the cemented negative lens placed in the second lens group, D12t the distance between the first lens group and the second lens group in the telephoto end state, and ft the focal length of the overall lens system in the telephoto end state, the following conditional equations hold true:

(1) 0.15<f2a/f2b<0.3, and (2) 0.3<D12t/ft<0.45.

In addition, an imaging apparatus according to an embodiment of the present invention includes a variable focal length lens system, and an imaging device which converts an optical image formed by the above-mentioned variable focal length lens system into electric signals. The above-mentioned variable focal length lens system includes, in order and from the side of the object, a first lens group having a positive refractive power, a second lens group having a negative refractive power, a third lens group having a positive refractive power, and a fourth lens group having a positive refractive power. When the lens position state changes from a wide-angle end state, where the focal length is shortest, to a telephoto end state, where the focal length is greatest, at least each of the lens groups from the above-mentioned first lens group to the above-mentioned fourth lens group is mobile, and the above-mentioned second lens group moves towards the image while the above-mentioned third lens group moves towards the object so that the gap between the above-mentioned first lens group and the above-mentioned second lens group grows bigger, while the gap between the above-mentioned second lens group and the above-mentioned third lens group becomes smaller. At the same time, the above-mentioned fourth lens group moves in the direction of the optical axis in order to compensate for the change in the position of the plane of the image that accompanies the movement of each of the lens groups. The above-mentioned first lens group is positioned closer to the object in the telephoto end state as compared to the wide-angle end state. The second lens group includes, in order and from the side of the object, a negative lens, which is of a meniscus shape and which has a concave surface and an aspherical surface on the image side, and a cemented negative lens, which is of a biconcave lens and a positive lens of a meniscus shape that has its convex surface facing the object. In addition, the following conditional equations hold true:

(1) 0.15<f2a/f2b<0.3, and (2) 0.3<D12t/ft<0.45.

According to the present invention, a high zoom ratio and miniaturization may be achieved.

DETAILED DESCRIPTION OF EMBODIMENTS

Figure 1:
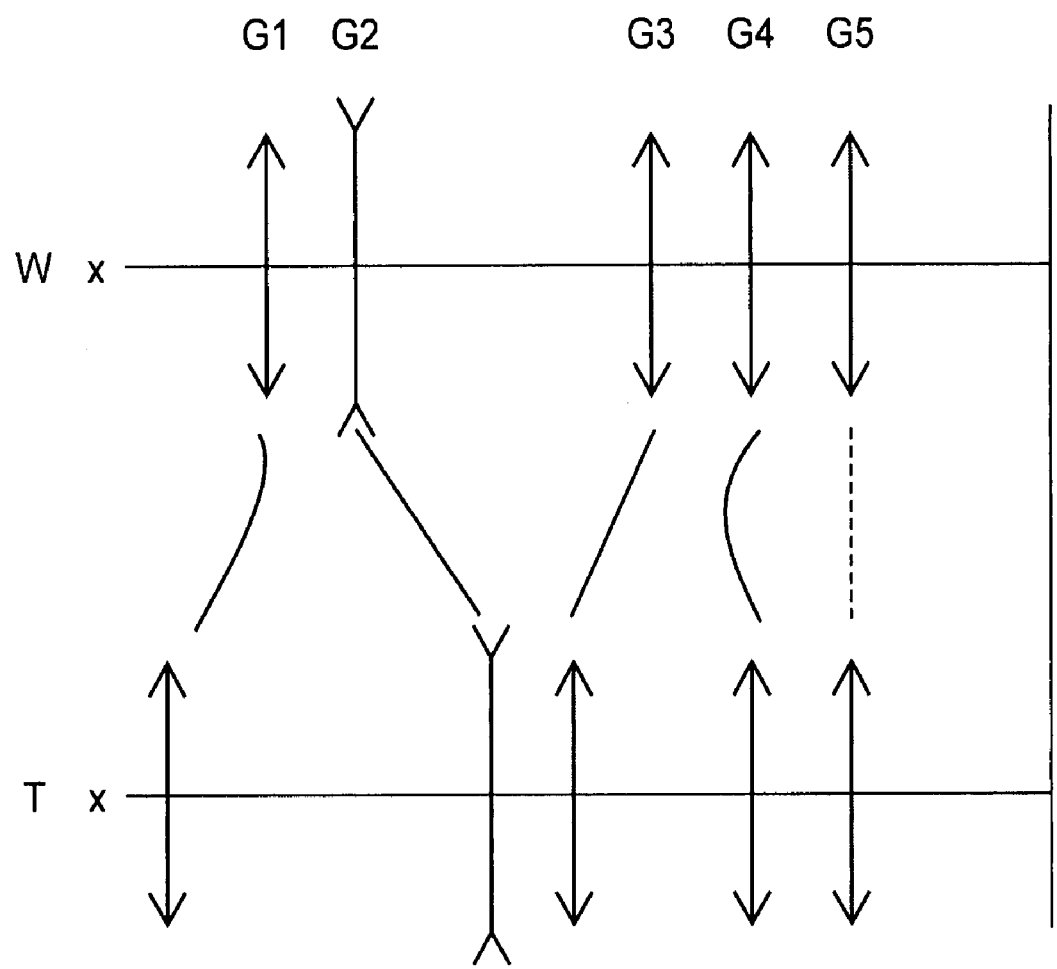
FIG. 1 is a schematic diagram illustrating the allocation of refractive power and the state of movement in relation to zooming in several embodiments of a variable focal length lens system of the present invention.

Hereinbelow, embodiments of a variable focal length lens system and imaging apparatus of the present invention are described.

A variable focal length lens system according to an embodiment of the present invention may include, in order and from the side of the object, a first lens group having a positive refractive power, a second lens group having a negative refractive power, a third lens group having a positive refractive power, and a fourth lens group having a positive refractive power. When the lens position state changes from a wide-angle end state, where the focal length is shortest, to a telephoto end state, where the focal length is greatest, at least each of the lens groups from the above-mentioned first lens group to the above-mentioned fourth lens group is mobile, and the above-mentioned second lens group moves towards the image while the above-mentioned third lens group moves towards the object so that the gap between the above-mentioned first lens group and the above-mentioned second lens group grows bigger, while the gap between the above-mentioned second lens group and the above-mentioned third lens group becomes smaller. At the same time, the above-mentioned fourth lens group moves in the direction of the optical axis in order to compensate for the change in the position of the plane of the image that accompanies the movement of each of the lens groups. The above-mentioned first lens group is positioned closer to the object in the telephoto end state as compared to the wide-angle end state. The second lens group may include, in order and from the side of the object, a negative lens, which is of a meniscus shape and which has a concave surface and an aspherical surface on the image side, and a cemented negative lens, which is of a biconcave lens and a positive lens of a meniscus shape that has its convex surface facing the object. The conditional equations (1) 0.15<f2a/f2b<0.3, and (2) 0.3<D12t/ft<0.45 are satisfied, where f2a is the focal length of the negative lens placed in the second lens group, f2b is the focal length of the cemented negative lens placed in the second lens group, D12t is the distance between the first lens group and the second lens group in the telephoto end state, and ft is the focal length of the overall lens system in the telephoto end state.

Therefore, according to a variable focal length lens system of the present embodiment, both a high zoom ratio and miniaturization can be achieved simultaneously.

In a variable focal length lens system of the present embodiment, in order to achieve both a high zoom ratio and miniaturization with the configuration described above, attention is given to decreasing the load placed on the second lens group in changing the lens position state, and, in order to secure stable optical qualities at the manufacturing stage, to simplifying the configuration of the second lens group.

Here, what is meant by decreasing the load placed on the second lens group in changing the lens position state is suppressing the change in the transverse magnification of the second lens group.

Assuming that $\phi 1$ is the refractive power of the first lens group, $\phi 2$ the refractive power of the second lens group, Dw the gap between the principal points of the first lens group and the second lens group in the wide-angle end state, and Dt the gap between principal points of the first lens group and the second lens group in the telephoto end state, the combined refractive power at the wide-angle end state $\phi 12w$ and the combined refractive power at the telephoto end state $\phi 12t$ may be expressed as follows:

$$\phi 12w = \phi 1 + \phi 2 - \phi 1 \cdot \phi 2 \cdot Dw$$

$$\phi 12t = \phi 1 + \phi 2 - \phi 1 \cdot \phi 2 \cdot Dt,$$

while the transverse magnification $\beta 2w$ and $\beta 2t$ of the second lens group in the wide-angle end state and the telephoto end state, respectively, may be expressed as follows:

$$\beta 2w = \phi 1 / \phi 12w$$

$$\beta 2t = \phi 1 / \phi 12t,$$

and therefore, the change in transverse magnification $\beta 2t/\beta 2w$ may be expressed as follows:

$$\beta 2t / \beta 2w = \phi 12w / \phi 12t$$

$$= (\phi 1 + \phi 2 - \phi 1 \cdot \phi 2 \cdot Dw) / (\phi 1 + \phi 2 - \phi 1 \cdot \phi 2 \cdot Dt)$$

Since φ1>0, and φ2<0, φ1+φ2 is relatively small, and as a result, the change in the transverse magnification of the second lens group is dependent upon the amount of change in the gap between the first lens group and the second lens group, namely, (Dw−Dt).

In a variable focal length lens system of the present embodiment, by decreasing (Dw−Dt), which is the amount of change in the gap between the first lens group and the second lens group, the load placed on the second lens group in zooming is reduced, and the occurrence of off-axis aberrations caused by the second lens group in connection with the change in the lens position state is suppressed, thereby achieving better performance.

With respect to a variable focal length lens system of the present embodiment, what is meant by simplifying the configuration of the second lens group is configuring the second lens group with two negative lens components (here, "one lens component" refers to a single lens or one cemented lens).

When the second lens group includes three or more lens components, factors that may contribute to misalignment which occur when the lenses are incorporated into the lens chamber at the manufacturing state increase, and it thus becomes difficult to secure stable optical qualities.

In a variable focal length lens system of the present embodiment, by configuring the second lens group with a negative lens, which has a meniscus shape, a concave surface facing the image side and has an aspherical surface image side, and a cemented negative lens, which has a negative biconcave lens and a positive lens whose convex surface faces the object side, where the cemented lens is placed on the image side of the negative lens with an air gap in between, factors that may contribute to misalignment that occur during incorporation into the lens chamber at the manufacturing stage are reduced, and stable optical qualities are thereby realized.

In particular, with respect to a variable focal length lens system of the present embodiment, by clarifying the aberration correction functions that each of the two lens components configuring the second lens group is to serve, better performance is achieved, and by reducing the effect of assembly errors at the manufacturing stage, stable optical qualities are realized.

More specifically, the negative lens positioned closer to the object has an aspherical surface and mainly plays the role of correcting fluctuations in coma aberration that accompany changes in the angle of field, and the cemented negative lens positioned closer to the image plays mainly the role of correcting axial aberration. By causing negative spherical aberration with the cemented surfaces, the above-mentioned cemented negative lens is capable of correcting axial aberration.

It is noted that while the above-mentioned cemented negative lens may be separated into two lens elements, namely a negative lens and a positive lens, when they are separated as such, there arises a need to sufficiently suppress performance degradation that may be caused by any misalignment between the negative lens and the positive lens. This is because positive spherical aberration is caused by the lens surface on the image side of the negative lens, negative spherical aberration is caused by the lens surface on the object side of the positive lens, and they are made to cancel each other out.

By sufficiently widening the gap between the negative lens and the positive lens, it is possible to weaken the refractive power and thereby suppress performance degradation, but this causes the lens diameter to become bigger.

In addition, since the second lens group becomes thicker, it becomes impossible to secure a sufficient amount of movement for the second lens group.

As mentioned above, with respect to a variable focal length lens system of the present embodiment, by simplifying the configuration of the second lens group, the second lens group becomes thinner, and it is thereby possible to reduce the lens diameter of the first lens group.

With respect to a variable focal length lens system of the present embodiment, by moving the first lens group closer towards the object side in the telephoto end state as compared to the wide-angle end state, the off-axis light beam that is incident upon the first lens group in the wide-angle end state is brought closer to the optical axis, and coma aberration that occurs in the periphery of the screen is thus well corrected for.

In addition, when the lens position state changes from the wide-angle end state to the telephoto end state, by moving the third lens group towards the object, the change in the transverse magnification of the third lens group that accompanies the change in the lens position state is increased, and the reduction in the change of the transverse magnification of the second lens group is thus compensated for.

By configuring a variable focal length lens system of the present embodiment in the manner described above while satisfying conditional equations (1) and (2), a higher zoom ratio and a smaller lens diameter can be achieved simultaneously.

$$0.15 < f2a/f2b < 0.3 \qquad \text{Conditional Equation (1)}$$

Conditional equation (1) is a conditional equation that defines the focal length of the above-mentioned cemented negative lens, and is a conditional equation that is necessary in order to simplify the configuration of the second lens group.

When the upper limit value of conditional equation (1) is exceeded (i.e. the refractive power of the cemented negative lens becomes stronger), it becomes impossible to correct the positive spherical aberration that occurs with respect to the cemented negative lens alone, and as a result, it becomes difficult to obtain the desired optical performance.

On the contrary, when the lower limit value of conditional equation (1) is not satisfied (i.e. the refractive power of the negative lens becomes stronger), the change, which accompanies the change in the lens position state, in the height of the off-axis light beam that passes through the negative lens becomes smaller. As a result, it becomes difficult to correct the change in off-axis aberration that accompanies the change in the lens position state.

$$0.3 < D12t/ft < 0.45 \qquad \text{Conditional Equation (2)}$$

As described above, with a variable focal length lens system of the present embodiment, the amount of change, in the gap between the first lens group and the second lens group, which accompanies the change in the lens position state, is made smaller. In the wide-angle end state, since the first lens group and the second lens group are placed in close proximity to each other, the above-mentioned amount of change in the gap is approximately comparable to the gap between the first lens group and the second lens group in the telephoto end state.

In addition, if Z (=ft/fw) is taken to be the zoom ratio, then D12t/ft=D12t/(fw·Z). Since fw serves to normalize at the focal length for the wide-angle end state, conditional equation (2) defines the value which is obtained by dividing the amount of change in the gap between the first lens group and the second lens group by the zoom ratio.

When the upper limit value for conditional equation (2) is exceeded, the range of the transverse magnification of the second lens group becomes greater. Therefore, when the configuration of the second lens group is simplified, fluctuations in the off-axis aberration which accompany the change in the lens position state become more significant, and it thus becomes difficult to obtain the desired optical performance.

On the contrary, when the lower limit value for conditional equation (2) is not satisfied, the range of the transverse magnification of the second lens group becomes smaller. However, the load placed upon the other lens groups becomes too big, and it thus becomes difficult to obtain the desired optical performance.

According to an embodiment of a variable focal length lens system of the present invention, in order to better correct for the on-axis aberration that occurs due to the cemented negative lens in the second lens group and to further improve performance, it is desirable that conditional equation (3) shown below be satisfied, where n2N is the refractive index of, with respect to the d-line, the negative lens of the cemented negative lens placed in the second lens group, and n2P is the refractive index of, with respect to the d-line, the positive lens of the cemented negative lens placed in the second lens group:

$$0.3 < n2P - n2N \tag{3}$$

Conditional equation (3) defines the negative spherical aberration that occurs at the cemented surfaces within the cemented negative lens.

When the lower limit value of conditional equation (3) is not satisfied, the difference in refractive index between the two lenses that configure the cemented negative lens becomes smaller. As a result, there is no choice but to reduce the radius of curvature of the cemented surfaces, causing the occurrence of a high order spherical aberration and making it difficult to obtain the desired optical performance, and at the same time the second lens group becomes thicker.

According to an embodiment of a variable focal length lens system of the present invention, during close-range focusing, it is desirable that the fourth lens group move in the direction of the optical axis, and conditional equations (4) and (5) shown below be satisfied, where β2w is the transverse magnification of the second lens group in the wide-angle end state, and β2t is the transverse magnification of the second lens group in the telephoto end state:

$$-1 < \beta 2w < 0 \tag{4}$$

$$\beta 2t < -1 \tag{5}$$

Generally, in a zoom lens, close-range focusing is performed by moving one of the lens groups making up the zoom lens in the direction of the optical axis. In a zoom lens whose first lens group has a positive refractive power, since the lens diameter of the first lens group is big, if close-range focusing is to be performed by moving the first lens group, the drive system has to be bigger in size, causing the lens tube diameter to become bigger.

In particular, as auto-focusing functions have become popular, faster operation speeds have been desired. In order to increase operation speed, it would be effective to reduce the amount of work (=weight×distance) that needs to be performed during auto-focusing, and a method of performing close-range focusing by moving a lens group that is positioned closer to the image than is the first lens group would therefore be suitable to this end.

However, in a positive-negative-positive-positive four-group zoom lens, when a position where the transverse magnification β2 of the second lens group is ×−1 and is held while changing the lens position state from the wide-angle end state to the telephoto end state, it is difficult to perform close-range focusing by way of the second lens group. This is because when the position is such that β2=−1, it is impossible to perform close-range focusing, and the direction of movement for the range −1<β2<0 is the opposite of that for the range β2<−1.

As described above, by performing close-range focusing by moving the fourth lens group, transverse magnification β2 of the second lens group becomes free. As a result, it becomes possible to weaken the refractive power of the second lens group, the degree of freedom in correcting for aberrations is enhanced, and further improvements in performance can be expected.

Conditional equations (4) and (5) signify that, by performing close-range focusing through the fourth lens group, restrictions on the transverse magnification of the second lens group disappear, and the degree of freedom in correcting for aberrations is enhanced.

In addition, when the lens position state changes from the wide-angle end state to the telephoto end state, the fourth lens group first moves towards the object while the transverse magnification of the second lens group is between −1 and 0, and the fourth lens group moves towards the image once the transverse magnification of the second lens group becomes smaller than −1.

With respect to a subject that is at a predetermined distance, the distance to be covered in order to perform close-range focusing is greater in the telephoto end state as compared to the wide-angle end state. As described above, by having the fourth lens group move, since the gap between the third lens group and the fourth lens group in the telephoto end state is sufficiently widened, it is possible to secure enough space for movement that is required for close-range focusing in the telephoto end state.

In a variable focal length lens system of the present embodiment, as described above, by decreasing the load placed on the second lens group in zooming, the configuration of the second lens group is simplified, but in order to maintain a predetermined zoom ratio, a lens group that is to compensate for the load related to zooming that is taken away from the second lens group is necessary.

As such, in a variable focal length lens system of the present embodiment, in relation to the fact that the contribution that the second lens group makes in zooming is decreased, the third lens group partially shoulders the load related to zooming by moving the third lens group towards the object in changing the lens position state from the wide-angle end state to the telephoto end state.

In an embodiment of a variable focal length lens system of the present invention, in order to further improve performance, it is desirable that conditional equation (6) shown below be satisfied, where Δ3 is the amount of movement of the third lens group when the lens position state changes from the wide-angle end state to the telephoto end state:

$$0.17 < \Delta 3/ft < 0.25 \tag{6}$$

Conditional equation (6) defines the proportion of zooming that the third lens group is responsible for, and defines the fluctuation in on-axis aberration that occurs when the lens position state is varied.

When the upper limit value of conditional equation (6) is exceeded, the proportion of zooming that the third lens group is responsible for becomes greater. In other words, the transverse magnification of the third lens group varies to a greater extent. As a result, the fluctuation in on-axis aberration that occurs due to the third lens group when the lens position state changes becomes greater, and it thus becomes difficult to achieve better performance and greater zoom ratios.

When the lower limit value of conditional equation (6) is not satisfied, the transverse magnification of the fourth lens group varies to a greater extent, causing the amount of movement of the fourth lens group to increase significantly particularly in the telephoto end state, and it thus causes the drive mechanism that performs close-range focusing to become more complex.

In an embodiment of a variable focal length lens system of the present invention, it is desirable to provide a fifth lens group on the image side of the fourth lens group, and it is desirable to have the fifth lens group configured with a negative parts group having a negative refractive power, and a positive parts group having a positive refractive power that is positioned on the image side of the above-mentioned negative parts group with an air gap in between.

The fifth lens group performs the functions described below.

One is the function of adjusting the exit pupil position. By providing the negative parts group having a negative refractive power and the positive parts group having a positive refractive power on the image side of the negative parts group with an air gap in between, the exit pupil position is distanced from the plane of the image. In other words, it becomes possible for the principal ray to reach the image plane position in a state where it is almost parallel to the optical axis.

The other function is that of correcting for distortion. By positioning the negative parts group having a negative refractive power in such a manner that the lens surface on the image side has a strong concave surface facing the image side, it becomes possible to correct for negative distortion that is likely to occur in the wide-angle end state.

In an embodiment of a variable focal length lens system of the present invention, by having the above-mentioned fifth lens group fixed in the direction of the optical axis when the lens position state is varied, it is possible to simplify the structure of the lens tube.

In a variable focal length lens system according to an embodiment of the present invention equipped with the fifth lens group, it is desirable that the third lens group be configured with a cemented positive lens of a positive lens and a negative lens.

In a positive-negative-positive-positive four-group zoom lens of related art, since there is only one lens group that has a negative refractive-power, negative distortion that is likely to occur in the wide-angle end state was corrected for by configuring the third lens group with a positive parts group having a positive refractive power and a negative parts group having a negative refractive power. As described above, by providing the fifth lens group, it is possible to correct for negative distortion by way of the fifth lens group. As a result, it becomes unnecessary to configure the third lens group with a positive parts group and a negative parts group.

However, as described above, since the third lens group is partially responsible for zooming, in order to correct for the spherical aberration that occurs in association with the change in the lens position state or in order to correct for chromatic aberration, a configuration using a cemented positive lens of a positive lens and a negative lens is desirable, and by adopting such a configuration, further enhancement of performance can be achieved.

In addition, in achieving smaller lens diameters, the positioning of the aperture stop is also important.

In general, when the aperture stop is positioned closer to the center of the optical system, it is possible to make the lens diameter of each of the lens groups smaller.

In a variable focal length lens system according to an embodiment of the present invention, the lens diameter is made smaller by positioning an aperture stop between the second lens group and the third lens group which brings the height of the off-axis luminous flux that is incident upon the first lens group closer to the optical axis in the wide-angle end state. In addition, by positioning the first lens group and the second lens group in proximity to each other, the off-axis luminous flux that passes through the second lens group in the wide-angle end state can be changed actively in accordance with the change in the angle of field, and fluctuations in coma aberration that accompany changes in the angle of field can thus be well corrected for.

In addition, with this configuration, where the aperture stop is positioned between the second lens group and the third lens group, by appropriately setting the focal lengths of the lens groups placed on the image side of the aperture stop (these lens groups will hereinafter be referred to as "latter groups"), it becomes possible to further miniaturize the first lens group.

In order to increase the zoom ratio to extreme extents, it is also necessary to widen the angle of field in the wide-angle end state.

The longer the focal length is in the telephoto end state, the bigger a subject can be photographed by getting closer to the subject. However, there is an issue in that the overall length of the lens becomes longer. With respect to a camera with a built-in lens, since the lens cannot be changed, it is unsuitable for indoor shooting unless a wide-conversion lens or the like is attached.

In a variable focal length lens system according to an embodiment of the present invention, in achieving a higher zoom ratio, attention is given to the fact that indoor shooting can be performed adequately without a conversion lens by widening the angle of field in the wide-angle end state.

In general, in order to achieve wider angles, because the angle of field becomes wider, the off-axis luminous flux that is incident upon the first lens group moves away from the optical axis. In other words, the lens diameter of the first lens group becomes greater.

In a variable focal length lens system according to an embodiment of the present invention, as a method of bringing the height at which the off-axis luminous flux is incident upon the first lens group closer to the optical axis, attention is given to reducing the angle formed between the off-axis luminous flux and the optical axis at the aperture stop position. For this reason, the aperture stop is positioned between the second lens group and the third lens group, and the aperture stop moves so as to narrow the gap between the second lens group and the aperture stop as the lens position state changes from the wide-angle end state to the telephoto end state.

In related art, in recording the image of a subject by an imaging device, the exit pupil position is distanced from the image plane so as to prevent shading by a micro lens array. In other words, it is almost an image side telecentric optical system.

In an image side telecentric optical system, the exit pupil is positioned at infinity, that is, it is characteristic in that the principal ray emerging from the optical system is parallel with the optical axis. In other words, the aperture stop is positioned at the object side focal position of the partial optical system (latter group) positioned on the image side of the aperture stop.

For this reason, the longer the focal length of the partial optical system (latter group) on the image side of the aperture stop is, the smaller the angle formed between the off-axis luminous flux and the optical axis at the aperture stop position can be made.

As such, in a variable focal length lens system according to an embodiment of the present invention, by extending the focal length of the latter group, the effective aperture of the first lens group is prevented from becoming large even when the angle of view is widened.

Therefore, in a variable focal length lens system according to an embodiment of the present invention, in order to reduce the lens diameter, assuming fw is the focal length of the overall lens system in the wide-angle end state, and that f35w is the combined focal length of the third lens group through the fifth lens group in the wide-angle end state, it is desirable that conditional equation (7) shown below be satisfied:

$$0.25 < fw/f35w < 0.3 \qquad (7)$$

When the upper limit value of conditional equation (7) is exceeded, since the focal length of the latter group becomes shorter, the angle formed between the principal ray and the optical axis at the aperture stop position becomes bigger. As a result, the off-axis luminous flux that is incident upon the first lens group in the wide-angle end state moves away from the optical axis, and it becomes difficult to achieve a sufficient reduction in the lens diameter.

When the lower limit value of conditional equation (7) is not satisfied, the gap between the second lens group and the third lens group required in the wide-angle end state in order to maintain the focal length in the wide-angle end state becomes extremely large, and it becomes difficult to reduce the overall length of the lens.

With a variable focal length lens system according to an embodiment of the present invention, in order to achieve a balance between a reduction in the lens diameter and better performance, assuming Dsw is the distance between the aperture stop and the image plane in the wide-angle end state, and that TLw is the overall length of the lens in the wide-angle end state, it is desirable that conditional equation (8) shown below be satisfied:

$$0.4 < Dsw/TLw < 0.55 \qquad (8)$$

Conditional equation (8) defines the position of the aperture stop in the wide-angle end state.

When the lower limit value of conditional equation (8) is not satisfied, the position of the aperture stop in the wide-angle end state moves towards the image plane. Thus, the off-axis luminous flux passing through the first lens group moves away from the optical axis, and it becomes difficult to achieve a further reduction in the lens diameter.

On the other hand, when the upper limit value of conditional equation (8) is exceeded, the distance between the aperture stop and the second lens group becomes shorter. Thus, the refractive power of the second lens group becomes too strong, and as a result, it becomes difficult to correct for fluctuations in coma aberration that accompany changes in the angle of field, and further improvements in performance become difficult to achieve.

With a variable focal length lens system according to an embodiment of the present invention, by having the aperture stop and the third lens group move together, it is possible to simplify the structure of the lens tube.

With respect to a variable focal length lens system according to an embodiment of the present invention, in order to further improve performance, it is preferable that the first lens group include three lenses, which are, in order and from the side of the object, a cemented lens, which is of a negative lens and a positive lens, and a positive lens.

Since the on-axis luminous flux is incident upon the first lens group with a wide luminous flux diameter in the telephoto end state, it is likely to give rise to negative spherical aberration. In addition, since the off-axis luminous flux is distanced from the optical axis when it is incident, off-axis aberration is likely to occur.

By placing the cemented lens of a negative lens and a positive lens on the side of the first lens group that is closest to the object, negative spherical aberration and on-axis chromatic aberration are well corrected for. The positive lens placed on the image side of the above-mentioned cemented lens mainly corrects for fluctuations in coma aberration that accompany changes in the angle of field. By clarifying the function of each lens, it is possible to achieve better optical performance.

With a variable focal length lens system according to an embodiment of the present invention, in order to correct for fluctuations in various aberrations that occur as the position of a subject changes, it is desirable that the fourth lens group include, in order and from the side of the object, a positive lens whose convex surface faces the image, and a negative lens whose concave surface faces the object.

By adopting a doublet configuration, it becomes possible to correct for both off-axis and on-axis aberrations at the same time, and fluctuations in various aberrations that occur when the position of the subject changes can thus be well corrected for.

With a variable focal length lens system according to an embodiment of the present invention, in order to better suppress chromatic aberration, it is desirable that a glass material having high anomalous dispersion properties be used for the first lens group.

In particular, of the lenses that make up the first lens group, by having the positive lens in the cemented lens be of a glass material having high anomalous dispersion properties, it is possible to well correct for secondary dispersion that occurs in the center portion of the screen in the telephoto end state.

With a variable focal length lens system according to each embodiment of the present invention, by employing an aspherical lens, it is possible to realize better optical performance. In particular, by introducing an aspherical surface into the fifth lens group, it becomes possible to further enhance central performance.

Further, even better optical performance can also be achieved by employing a plurality of aspherical surfaces.

In addition, with a variable focal length lens system according to each embodiment of the present invention, it is possible to shift the image by shifting, as a shift lens group, one lens group of the constituent lens groups or a group of parts within one lens group in a direction that is almost perpendicular to the optical axis. Further, by combining a drive system with a detection system that detects movements of the camera that cause blurring, and a computation system that computes the amount of correction in accordance with the output from the detection system, where the drive system shifts the above-mentioned shift lens group in accordance with the output from the computation system, it is possible to have it function as an image stabilizing optical system.

With variable focal length lens systems of each of the configurations described above, it is desirable to have, in particular, either the third lens group or the positive parts group in the fifth lens group function as the shift lens group.

This is because the third lens group is positioned close to the aperture stop, the off-axis luminous flux passes through a position close to the optical axis, and fluctuations in off-axis aberration when the lens group is shifted, are small. In addition, this is because, with respect to the positive parts group in the fifth lens group, the exit pupil is far from the position of the image plane, and fluctuations in off-axis aberration that occur when the positive parts group is shifted are small.

Next, specific embodiments of a zoom lens of the present invention and numerical embodiments in which actual numerical values are applied to the above-mentioned specific embodiments will be described with reference to drawings and tables.

It is noted that an aspherical surface is introduced in each of the embodiments, and the shape of the above-mentioned aspherical surface is to be defined by equation 1 shown below, where x is the sag amount, y the height from the optical axis, c the curvature, K the conic constant, A, B, C and D the fourth-, sixth-, eighth- and tenth-order, respectively, aspherical coefficients, and where the direction in which light travels is taken to be the positive direction.

$$x = cy^2/(1+(1-(1+\kappa)c^2y^2)^{1/2}) + Ay^4 + By^6 + \ldots \quad [\text{Equation 1}]$$

FIG. 1 illustrates the allocation of refractive power with respect to a variable focal length lens system according to first through fourth embodiments of the present invention and this variable focal length lens system includes, in order and from the side of the object: a first lens group G1 having a positive refractive power, a second lens group G2 having a negative refractive power, a third lens group G3 having a positive refractive power, a fourth lens group G4 having a positive refractive power, and a fifth lens group G5 having a positive refractive power. In zooming from a wide-angle end state (the state shown on the upper side) to a telephoto end state (the state shown on the lower side), the first lens group through the fourth lens group move along an optical axis x as indicated with the arrow in such a manner that the air gap between the first lens group G1 and the second lens group G2 widens, while the air gap between the second lens group G2 and the third lens group G3 narrows. In other words, after first moving towards the image, the first lens group G1 then moves towards the object, while the second lens group G2 moves towards the image, the third lens group G3 moves towards the object, the fifth lens group is stationary, and the fourth lens group G4 moves so as to correct for changes in the position of the image plane that occur in association with the movements of each lens group while it also moves towards the object during close-range focusing.

Figure 2:
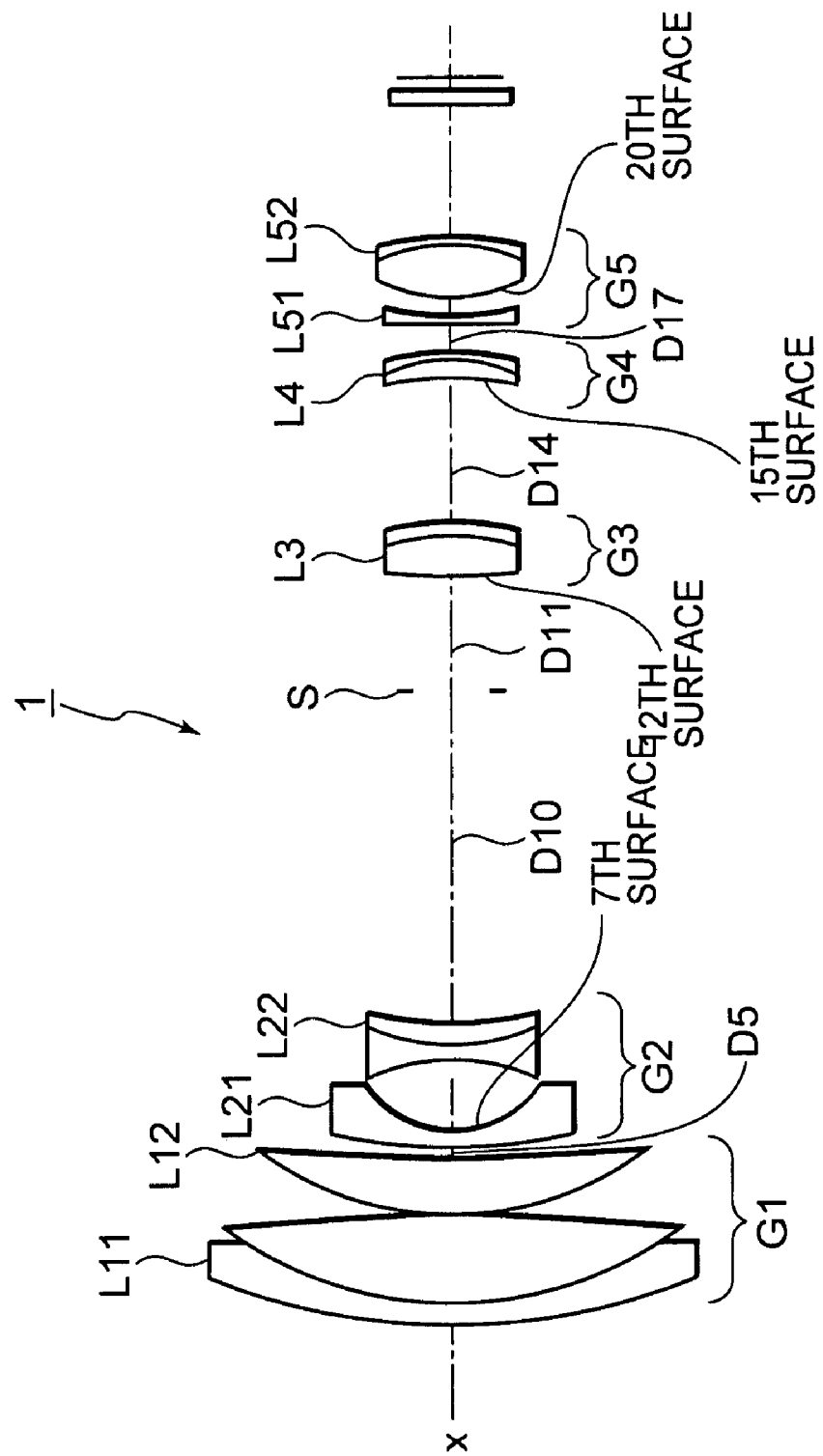
FIG. 2 illustrates the lens configuration for an embodiment of a variable focal length lens system according to the present invention.

FIG. 2 illustrates the lens configuration of first embodiment 1 of a variable focal length lens system of the present invention. The first lens group G1 includes, in order and from the side of the object, a cemented lens L11, which is of a negative lens having a meniscus shape and whose convex surface is turned towards the object and a positive lens whose convex surface is turned towards the object, as well as a positive lens L12 whose convex surface is turned towards the object. The second lens group G2 includes, in order and from the side of the object, a negative lens L21 of a meniscus shape that has an aspherical surface on the image side and whose concave surface is turned towards the image, as well as a cemented negative lens L22, which is of a negative lens having a bi-concave shape and a positive lens of a meniscus shape and whose convex surface is turned towards the object. The third lens group G3 includes, in order and from the side of the object, a cemented positive lens L3, which is of a positive lens of a bi-convex shape and that has an aspherical surface on the object side and a negative lens of a meniscus shape and whose concave surface is turned towards the object. The fourth lens group G4 includes, in order and from the side of the object, a cemented lens L4, which is of a positive lens having a meniscus shape with an aspherical surface on the object side and whose concave surface is turned towards the object and a negative lens of a meniscus shape whose concave surface is turned towards the object. The fifth lens group G5 includes, in order and from the side of the object, a negative lens L51 of a meniscus shape whose concave surface is turned towards the image, and a cemented lens L52, which is of a positive lens of a bi-convex shape with an aspherical surface on the object side and a negative lens of a meniscus shape whose concave surface is turned towards the object. In addition, an aperture stop S is positioned between the second lens group G2 and the third lens group G3, and this aperture stop S moves in a direction x of the optical axis as the lens position state changes.

In table 1, the lens data of numerical embodiment 1, in which actual numerical values are applied to the above-mentioned first embodiment 1, are shown. In the tables indicating the lens data of this numerical embodiment 1 as well as of each of the numerical embodiments described afterwards, the surface number indicates the ith optical surface counting from the side of the object, the radius of curvature indicates the radius of curvature of the ith surface counting from the side of the object, the surface gap indicates the axial surface gap between the ith optical surface counting from the side of the object and the i+1th optical surface, the refractive index indicates the refractive index, with respect to the d-line ($\lambda$=587.6 nm), of the glass material that has the ith optical surface on the object side, and the Abbe number indicates the Abbe number, with respect to the d-line, of the glass material that has the ith optical surface on the object side. In addition, f indicates the focal length, FNO indicates the F-number, and 2$\omega$ indicates the angle of field.

TABLE 1

| f | 1.00~2.05~4.24~7.39~14.10 |
| FNO | 2.86~3.26~3.64~3.70~4.61 |
| 2$\omega$ | 71.67°~36.11°~18.01°~10.38°~5.42° |

| SURFACE NUMBER | RADIUS OF CURVATURE | SURFACE GAP | REFRACTIVE INDEX | ABBE NUMBER | |
|---|---|---|---|---|---|
| 1: | 10.9095 | 0.276 | 1.90366 | 31.1 | |
| 2: | 5.8998 | 1.168 | 1.49700 | 81.6 | |
| 3: | −32.2964 | 0.038 | | | |
| 4: | 5.0254 | 0.706 | 1.60300 | 65.5 | |
| 5: | 20.8025 | (D5) | | | |
| 6: | 12.0074 | 0.133 | 1.90366 | 31.1 | |
| 7: | 1.4993 | 1.027 | | | |
| 8: | −2.6542 | 0.114 | 1.48749 | 70.4 | |
| 9: | 2.4572 | 0.358 | 1.94595 | 18.0 | |
| 10: | 8.0874 | (D10) | | | |
| 11: | 0.0000 | (D11) | | | (Aperture Stop) |
| 12: | 4.2067 | 0.552 | 1.69350 | 53.3 | |
| 13: | −2.5440 | 0.114 | 1.76182 | 26.6 | |
| 14: | −5.8499 | (D14) | | | |
| 15: | −5.5627 | 0.272 | 1.60300 | 65.5 | |
| 16: | −2.0160 | 0.076 | 1.90366 | 31.1 | |
| 17: | −2.7080 | (D17) | | | |
| 18: | 23.7981 | 0.095 | 1.88300 | 40.8 | |

TABLE 1-continued

| | f | 1.00~2.05~4.24~7.39~14.10 | | |
| | FNO | 2.86~3.26~3.64~3.70~4.61 | | |
| | 2ω | 71.67°~36.11°~18.01°~10.38°~5.42° | | |

| SUR-FACE NUMBER | RADIUS OF CUR-VATURE | SURFACE GAP | REFRAC-TIVE INDEX | ABBE NUMBER |
|---|---|---|---|---|
| 19: | 2.8530 | 0.285 | | |
| 20: | 2.3420 | 0.666 | 1.58313 | 59.5 |
| 21: | −2.3784 | 0.095 | 1.84666 | 23.8 |
| 22: | −4.0106 | 1.794 | | |
| 23: | 0.0000 | 0.152 | 1.51680 | 64.2 |
| 24: | 0.0000 | (Bf) | | |

The seventh, twelfth, fifteenth and twentieth surfaces are aspherical. As such, the fourth- (A), sixth- (B), eighth- (C) and tenth-order (D) aspheric coefficients of these surfaces in numerical embodiment 1 are shown in table 2 along with their conic constants (κ). It is noted that in table 2 and the subsequent tables showing the aspherical coefficients, "E−i" is an exponential notation to base 10, in other words, "E−i" represents "$10^{-i}$", and, "0.12345E-05" represents, for example, "$0.12345 \times 10^{-5}$".

TABLE 2

| 7th Surface | κ = 0.000000 | A = −0.135737E-02 | B = −0.521916E-03 | C = −0.347911E-02 | D = +0.413344E-02 |
| 12th Surface | κ = 0.000000 | A = −0.673780E-02 | B = +0.479402E-02 | C = +0.796889E-02 | D = +0.458605E-02 |
| 15th Surface | κ = 0.000000 | A = −0.627487E-02 | B = −0.353678E-02 | C = +0.663879E-02 | D = −0.423531E-02 |
| 20th Surface | κ = 0.000000 | A = −0.117751E-01 | B = +0.335768E-02 | C = −0.409342E-02 | D = +0.140861E-02 |

As the lens position state changes from the wide-angle end state to the telephoto end state, surface gap D5 between the first lens group G1 and the second lens group G2, surface gap D10 between the second lens group G2 and the aperture stop S, surface gap D11 between the aperture stop S and the third lens group G3, surface gap D14 between the third lens group G3 and the fourth lens group G4, and surface gap D17 between the fourth lens group G4 and the fifth lens group G5 change. As such, values for each of the above-mentioned surface gaps with respect to numerical embodiment 1 at the wide-angle end (f=1.000), three mid-focal lengths between the wide-angle end and the telephoto end (f=2.053), (f=4.238) and (f=7.393), and the telephoto end (f=14.105) are shown in table 3 along with the respective focal lengths f.

TABLE 3

(Variable Gap Table)

| f | 1.000 | 2.053 | 4.238 | 7.393 | 14.105 |
|---|---|---|---|---|---|
| D5 | 0.171 | 1.715 | 3.246 | 4.335 | 4.962 |
| D10 | 4.414 | 2.381 | 1.252 | 0.754 | 0.514 |
| D11 | 1.548 | 1.262 | 1.101 | 1.018 | 0.228 |
| D14 | 1.956 | 1.423 | 0.854 | 1.030 | 2.635 |
| D17 | 0.359 | 1.638 | 2.759 | 2.764 | 2.507 |
| Bf | 0.177 | 0.177 | 0.177 | 0.177 | 0.177 |

Corresponding values for conditional equations (1) through (8) with respect to numerical embodiment 1 are indicated in table 4.

TABLE 4

| f2a = −1.907 |
| f2b = −8.853 |
| f35w = 0.272 |
| (1) f2a/f2b = 0.215 |
| (2) D12t/ft = 0.352 |
| (3) n2P − n2N = 0.458 |
| (4) β2w = −0.248 |
| (5) β2t = −1.539 |
| (6) Δ3/ft = 0.200 |
| (7) fw/f35w = 0.272 |
| (8) Dsw/TLw = 0.492 |

Figure 3:
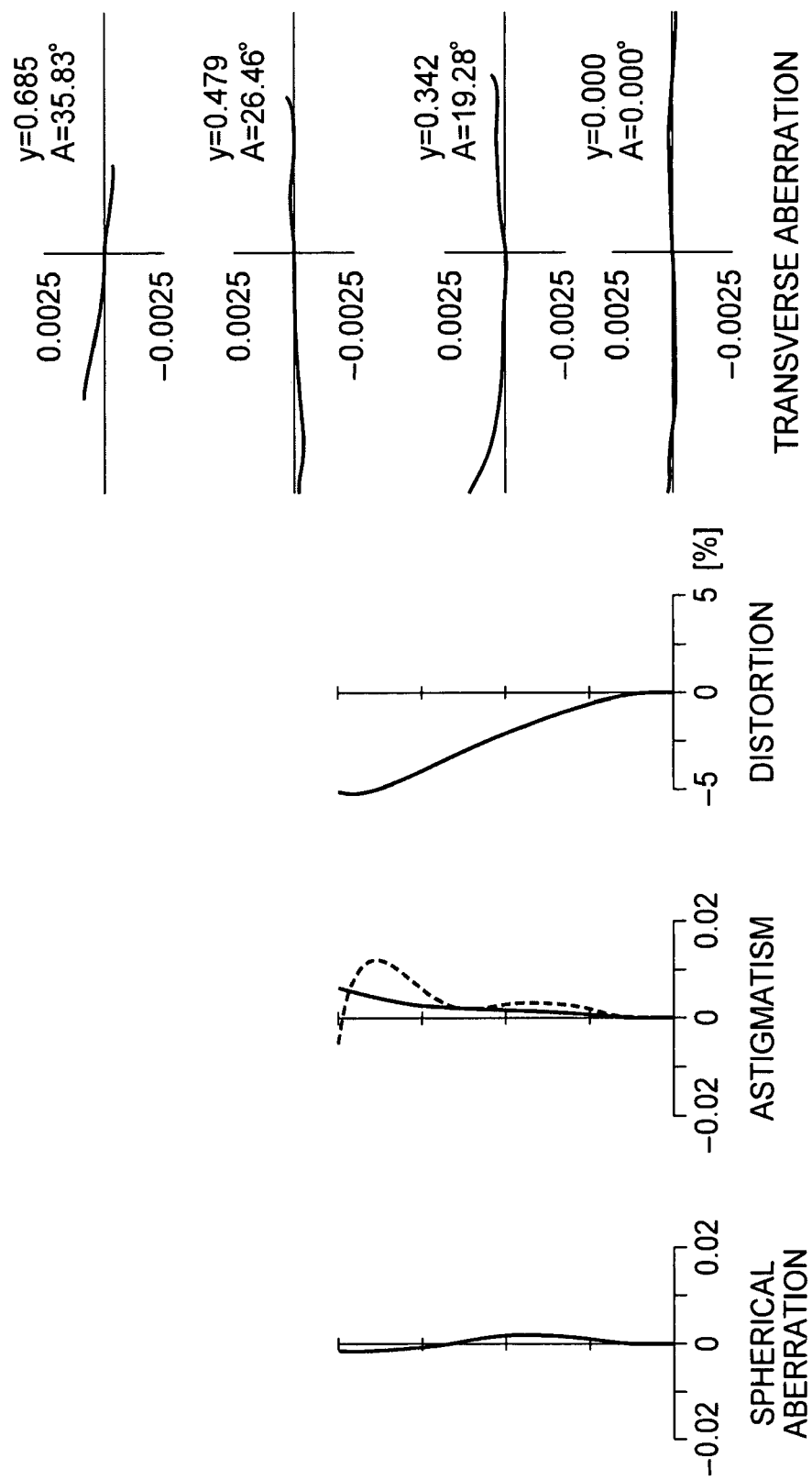
FIG. 3, along with FIGS. 4 through 7, shows various aberration graphs with respect to a numerical embodiment in which specific values are applied to an embodiment of a variable focal length lens system of the present invention, and the graphs in FIG. 3 illustrate the spherical aberration, astigmatism, distortion and transverse aberration in a wide-angle end state.
Figure 4:
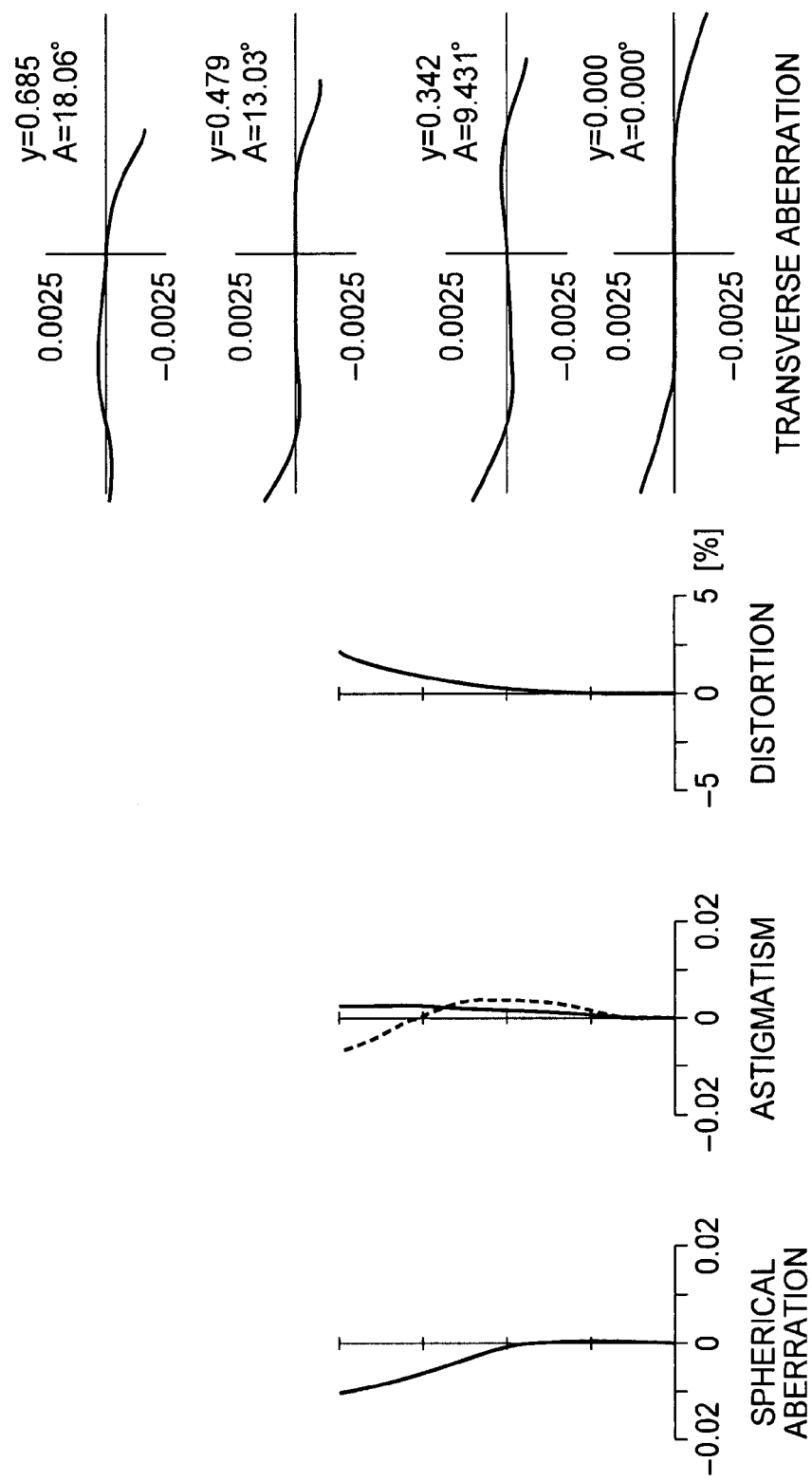
FIG. 4 illustrates the spherical aberration, astigmatism, distortion and transverse aberration in a first mid-focal length state.
Figure 5:
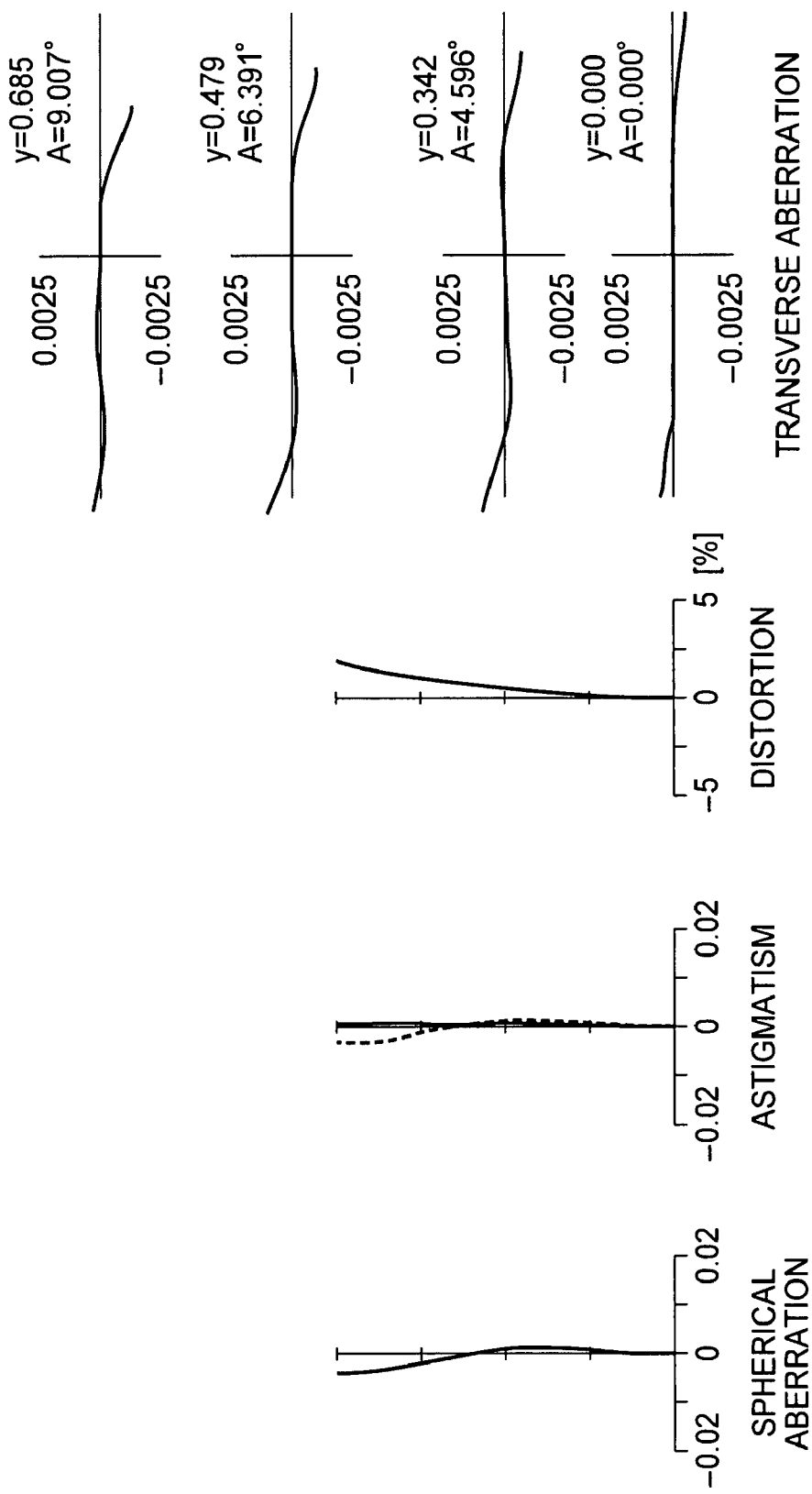
FIG. 5 illustrates the spherical aberration, astigmatism, distortion and transverse aberration in a second mid-focal length state.
Figure 6:
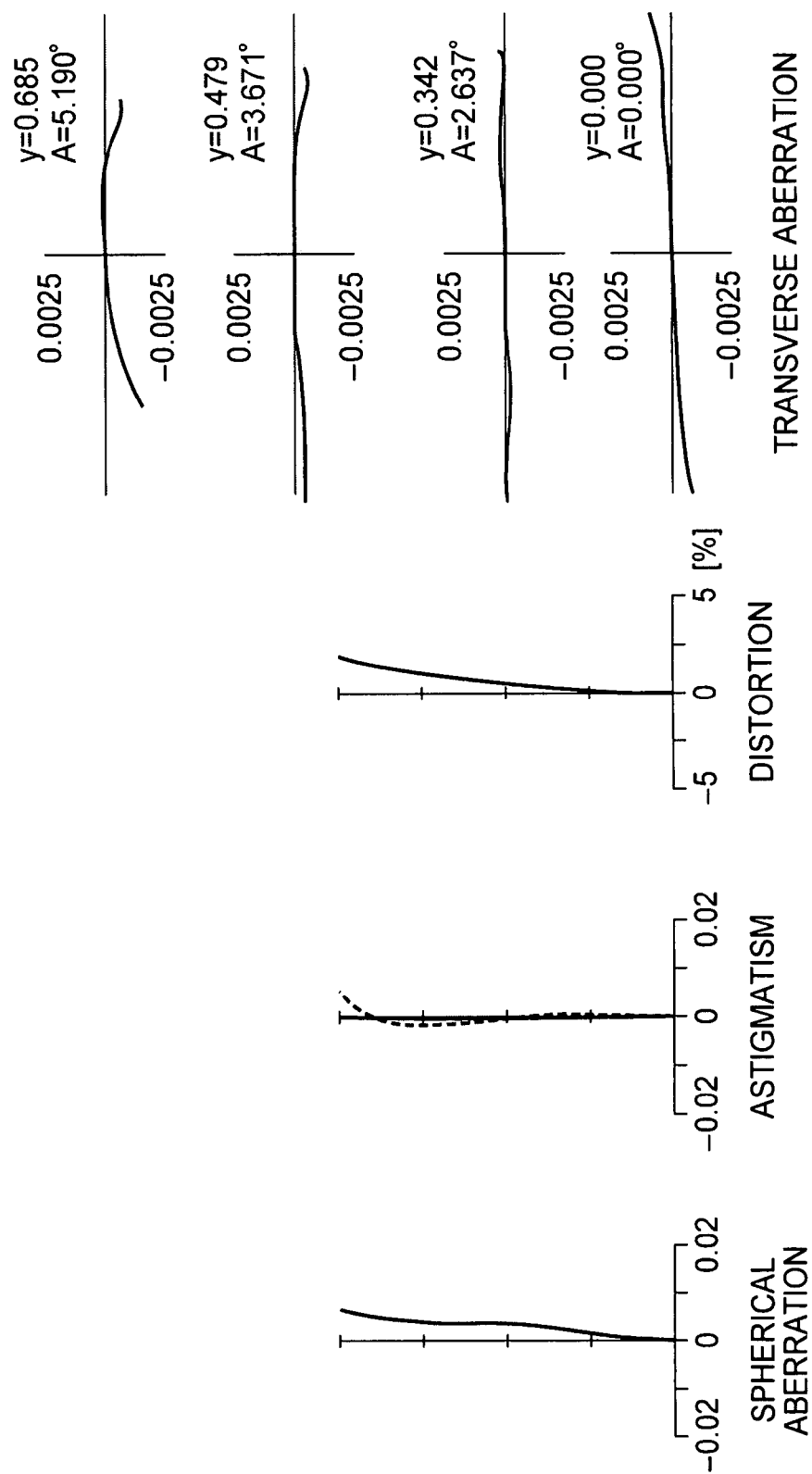
FIG. 6 illustrates the spherical aberration, astigmatism, distortion and transverse aberration in a third mid-focal length state.
Figure 7:
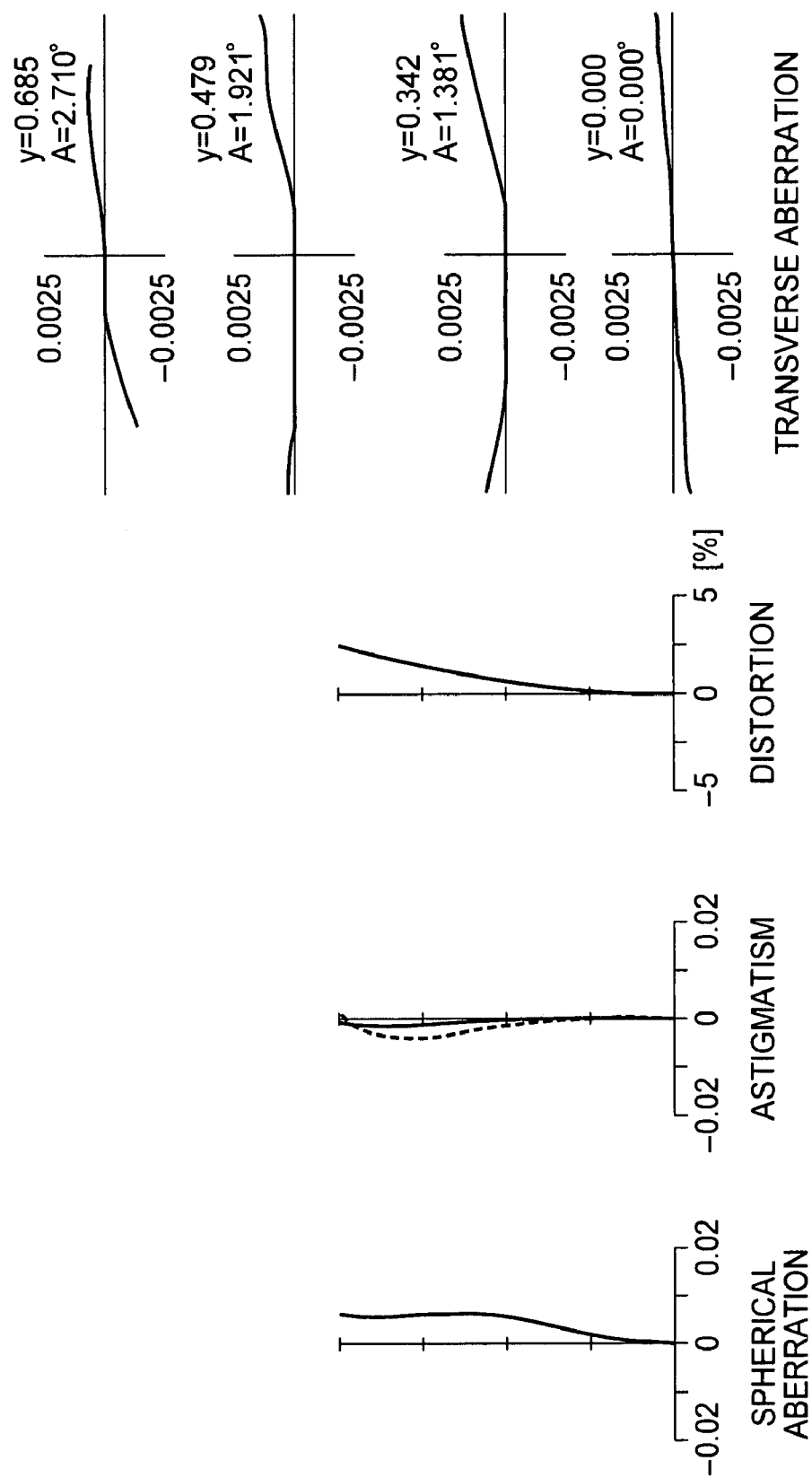
FIG. 7 illustrates the spherical aberration, astigmatism, distortion and transverse aberration in a telephoto end state.

FIGS. 3 through 7 show various aberration graphs for numerical embodiment 1 focused at infinity, where FIG. 3 is for the wide-angle end state (f=1.000), FIG. 4 is for a first mid-focal length state (f=2.053), FIG. 5 is for a second mid-focal length state (f=4.238), FIG. 6 is for a third mid-focal length state (f=7.393), and FIG. 7 is for the telephoto end state (f=14.105).

In the various aberration graphs in FIGS. 3 through 7, the solid line in the spherical aberration graphs indicates spherical aberration, the solid line in the astigmatism graphs indicates the sagittal image plane while the broken line indicates the meridional image plane. In the transverse aberration graphs, A represents the angle of field, while y indicates the image height.

From these aberration graphs, it is obvious that various aberrations are well corrected for in numerical embodiment 1, and that numerical embodiment 1 is superior in terms of imaging performance.

Figure 8:
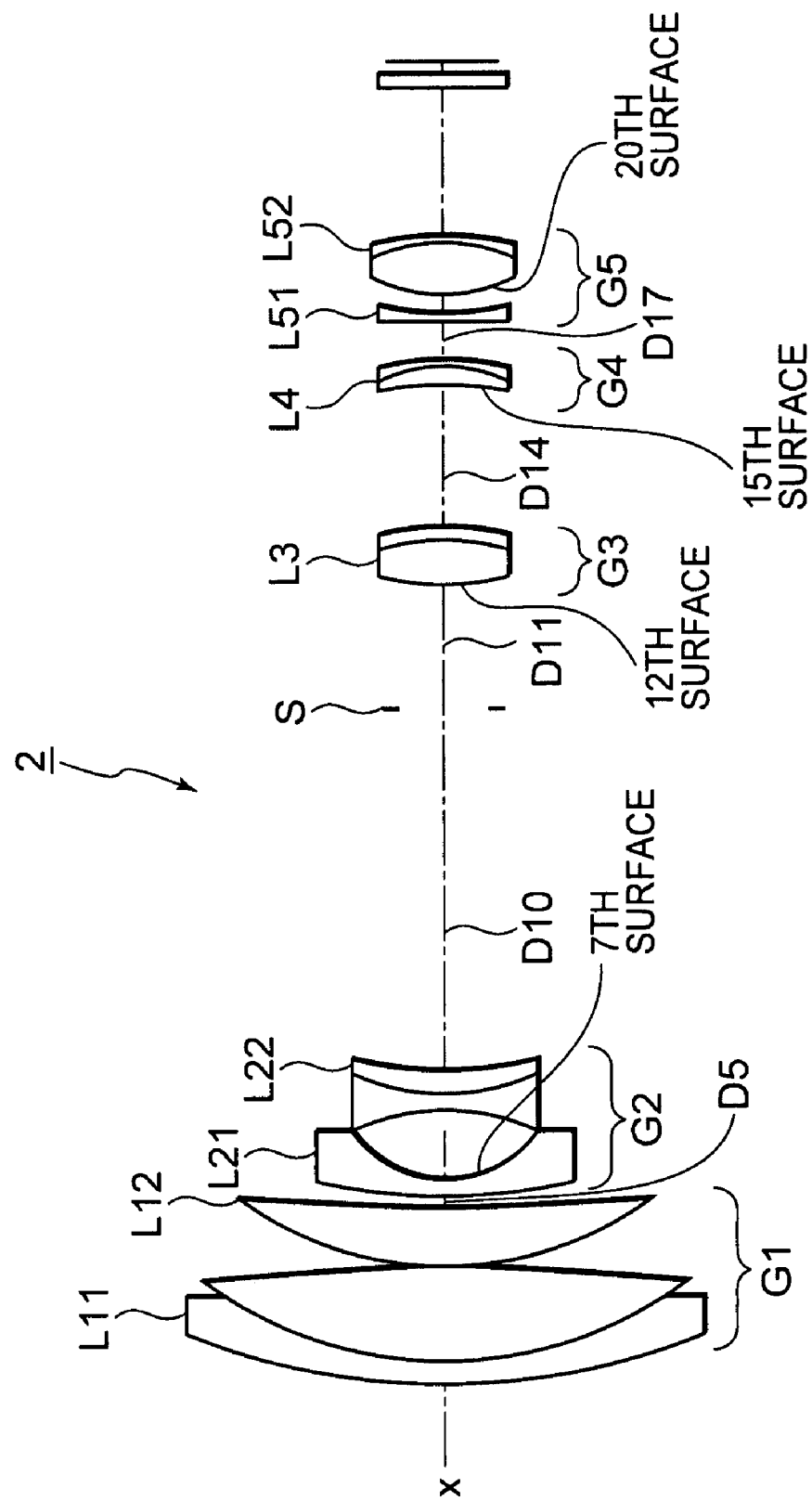
FIG. 8 illustrates the lens configuration for another embodiment of a variable focal length lens system according to the present invention.

FIG. 8 illustrates the lens configuration of a second embodiment 2 of a variable focal length lens system of the present invention. A first lens group G1 includes, in order and from the side of the object, a cemented lens L11, which is of a negative lens having a meniscus shape and whose convex surface is turned towards the object and a positive lens whose convex surface is turned towards the object, as well as a positive lens L12 whose convex surface is turned towards the object. A second lens group G2 includes, in order and from the side of the object, a negative lens L21 of a meniscus shape that has an aspherical surface on the image side and whose concave surface is turned towards the image, as well as a cemented negative lens L22, which is of a negative lens having a bi-concave shape and a positive lens of a meniscus shape and whose convex surface is turned towards the object. A third lens group G3 includes, in order and from the side of the object, a cemented positive lens L3, which is of a positive lens of a bi-convex shape and that has an aspherical surface on the object side and a negative lens of a meniscus shape and whose concave surface is turned towards the object. A fourth lens group G4 includes, in order and from the side of the object, a cemented lens L4, which is of a positive lens having a meniscus shape with an aspherical surface on the object side and whose concave surface is turned towards the object and a negative lens of a meniscus shape whose concave surface is turned towards the object. A fifth lens group G5 includes, in order and from the side of the object, a negative lens L51 of a meniscus shape whose concave surface is turned towards the image, and a cemented lens L52, which is of a positive lens of a bi-convex shape with an aspherical surface on the object side and a negative lens of a meniscus shape whose concave surface is turned towards the object. In addition, an aperture stop S is positioned between the second lens group G2 and the third lens group G3, and this aperture stop S moves in a direction x of the optical axis as the lens position state changes.

In table 5, the lens data of numerical embodiment 2, in which actual numerical values are applied to the above-mentioned second embodiment 2, are shown.

TABLE 5 f 1.00~2.05~4.24~7.39~14.10
FNO 2.86~3.26~3.64~3.70~4.61
2ω 71.67°~36.11°~18.01°~10.38°~5.42°

| SURFACE NUMBER | RADIUS OF CURVATURE | SURFACE GAP | REFRACTIVE INDEX | ABHE NUMBER |
|---|---|---|---|---|
| 1: | 10.5467 | 0.276 | 1.90366 | 31.1 |
| 2: | 5.5755 | 1.065 | 1.49700 | 81.6 |
| 3: | −48.9373 | 0.038 | | |
| 4: | 4.8926 | 0.750 | 1.60300 | 65.5 |
| 5: | 20.8886 | (D5) | | |
| 6: | 11.1408 | 0.133 | 1.88300 | 40.8 |
| 7: | 1.4287 | 0.951 | | |
| 8: | −3.2164 | 0.114 | 1.48749 | 70.4 |
| 9: | 2.0242 | 0.420 | 1.84666 | 23.8 |
| 10: | 7.4083 | (D10) | | |
| 11: | 0.0000 | (D11) | | (Aperture Stop) |
| 12: | 4.1790 | 0.552 | 1.69350 | 53.3 |
| 13: | −2.6765 | 0.114 | 1.75520 | 27.5 |
| 14: | −6.1128 | (D14) | | |
| 15: | −5.4223 | 0.270 | 1.58313 | 59.5 |
| 16: | −1.8453 | 0.076 | 1.90366 | 31.1 |
| 17: | −2.4960 | (D17) | | |
| 18: | 23.8024 | 0.095 | 1.88300 | 40.8 |
| 19: | 2.8536 | 0.285 | | |
| 20: | 2.3608 | 0.666 | 1.58313 | 59.5 |
| 21: | −2.4097 | 0.095 | 1.84666 | 23.8 |
| 22: | −4.0464 | 1.776 | | |
| 23: | 0.0000 | 0.152 | 1.51680 | 64.2 |
| 24: | 0.0000 | (Bf) | | |

The seventh, twelfth, fifteenth and twentieth surfaces are all aspherical. As such, the fourth- (A), sixth- (B), eighth- (C) and tenth-order (D) aspheric coefficients of these surfaces in numerical embodiment 2 are shown in table 6 along with their conic constants (κ).

As the lens position state changes from the wide-angle end state to the telephoto end state, surface gap D5 between the first lens group G1 and the second lens group G2, surface gap D10 between the second lens group G2 and the aperture stop S, surface gap D11 between the aperture stop S and the third lens group G3, surface gap D14 between the third lens group G3 and the fourth lens group G4, and surface gap D17 between the fourth lens group G4 and the fifth lens group G5 change. As such, values for each of the above-mentioned surface gaps with respect to numerical embodiment 2 at the wide-angle end (f=1.000), three mid-focal lengths between the wide-angle end and the telephoto end (f=1.977), (f=3.860) and (f=7.395), and the telephoto end (f=14.105) are shown in table 7 along with the respective focal lengths f.

TABLE 7

(Variable Gap Table)

| f | 1.000 | 1.977 | 3.860 | 7.395 | 14.105 |
|---|---|---|---|---|---|
| D5 | 0.171 | 1.701 | 3.114 | 4.452 | 5.121 |
| D10 | 4.539 | 2.518 | 1.340 | 0.693 | 0.571 |
| D11 | 1.605 | 1.319 | 1.158 | 1.075 | 0.285 |
| D14 | 1.778 | 1.223 | 0.697 | 0.776 | 3.296 |
| D17 | 0.449 | 1.611 | 2.661 | 2.733 | 1.740 |
| Bf | 0.177 | 0.177 | 0.177 | 0.177 | 0.177 |

Corresponding values for conditional equations (1) through (8) with respect to numerical embodiment 2 are indicated in table 8.

TABLE 8 f2a = −1.868
f2b = −11.501
f35w = 0.277
(1) f2a/f2b = 0.162
(2) D12t/ft = 0.363
(3) n2P − n2N = 0.359
(4) β2w = −0.252
(5) β2t = −1.651
(6) Δ3/ft = 0.199
(7) fw/f35w = 0.277
(8) Dsw/TLw = 0.489

Figure 9:
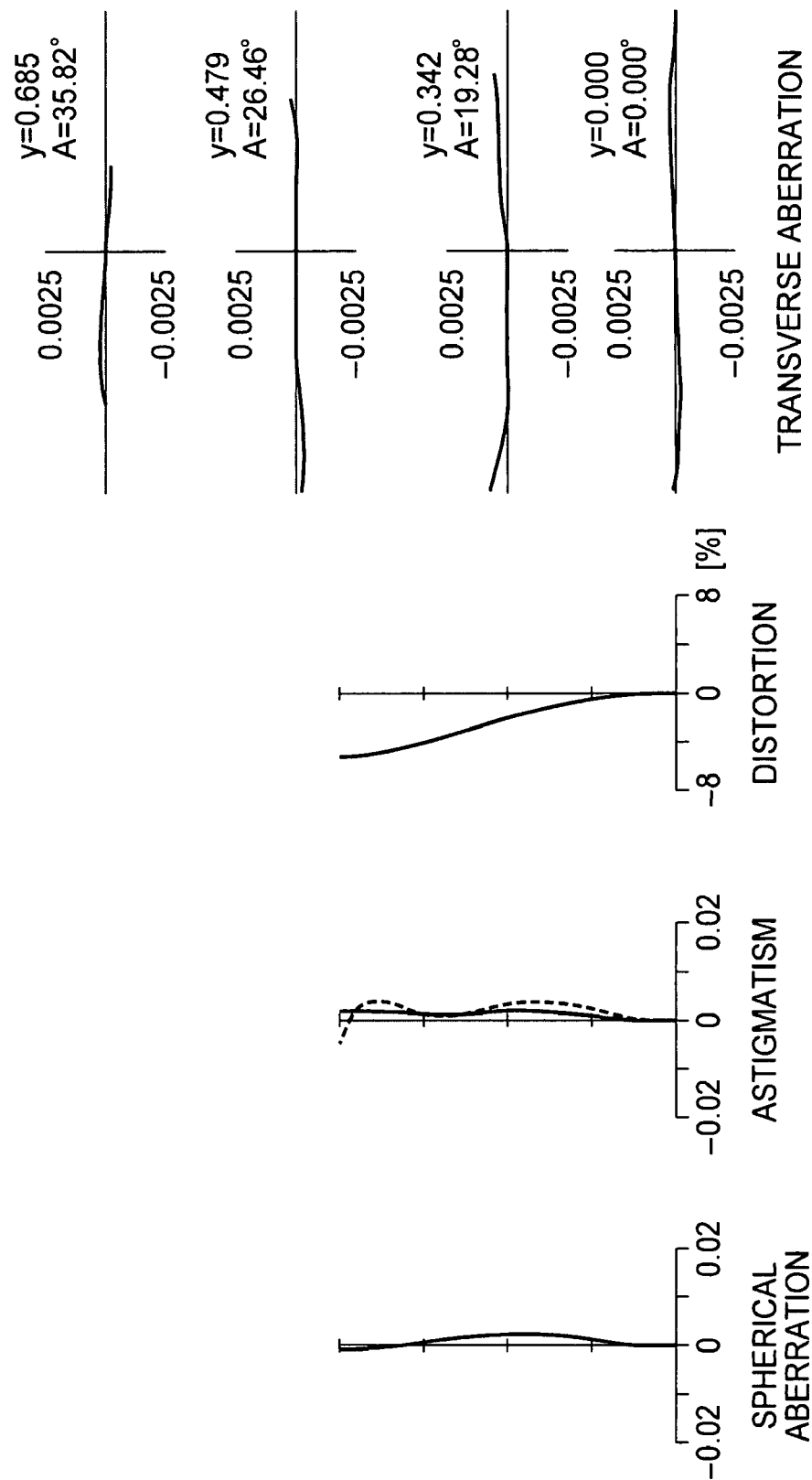
FIG. 9, along with FIGS. 10 through 13, shows various aberration graphs with respect to another numerical embodiment in which specific values are applied to the variable focal length lens system shown in FIG. 8, and the graphs in FIG. 9 illustrate the spherical aberration, astigmatism, distortion and transverse aberration in a wide-angle end state.
Figure 10:
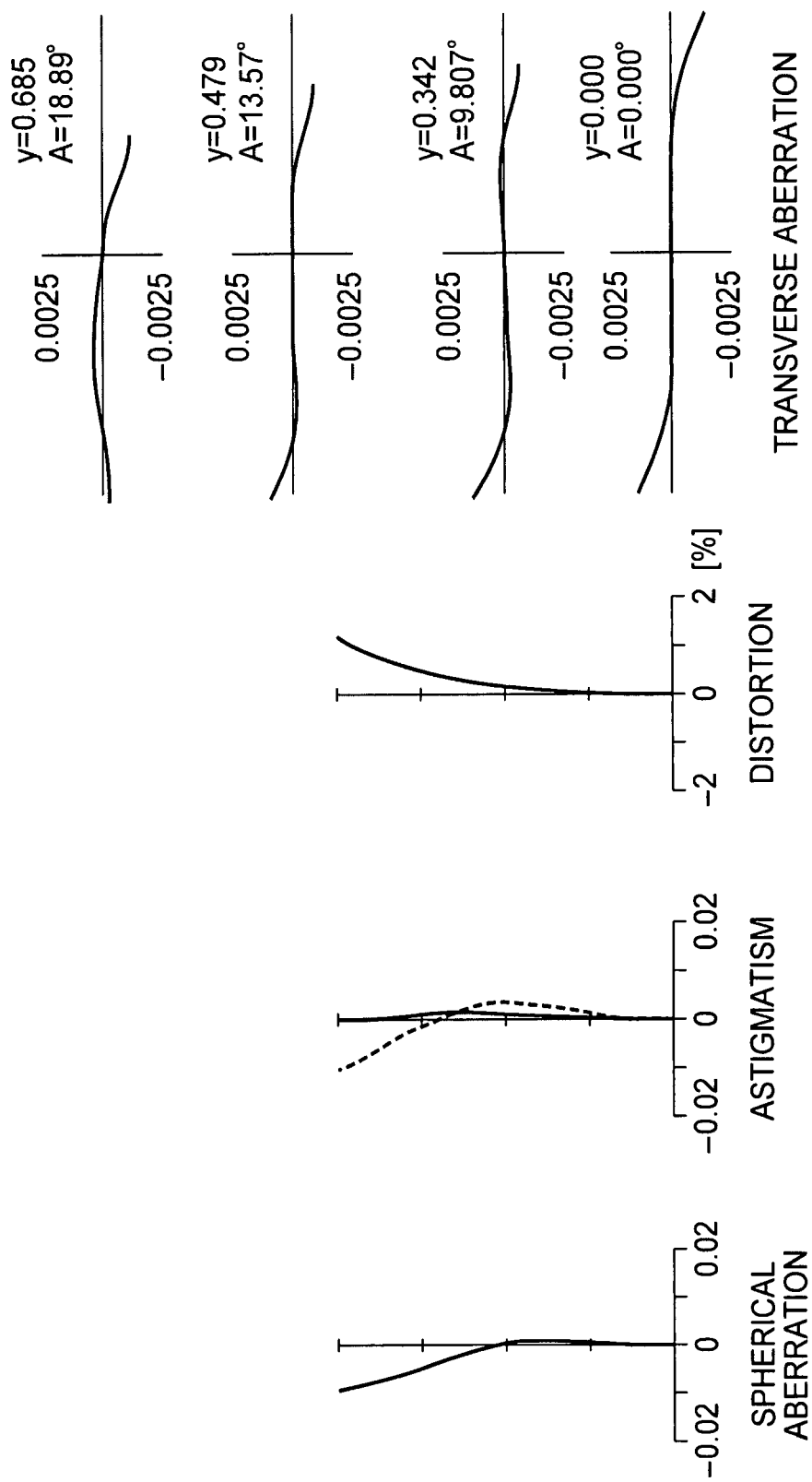
FIG. 10 illustrates the spherical aberration, astigmatism, distortion and transverse aberration in a first mid-focal length state.
Figure 11:
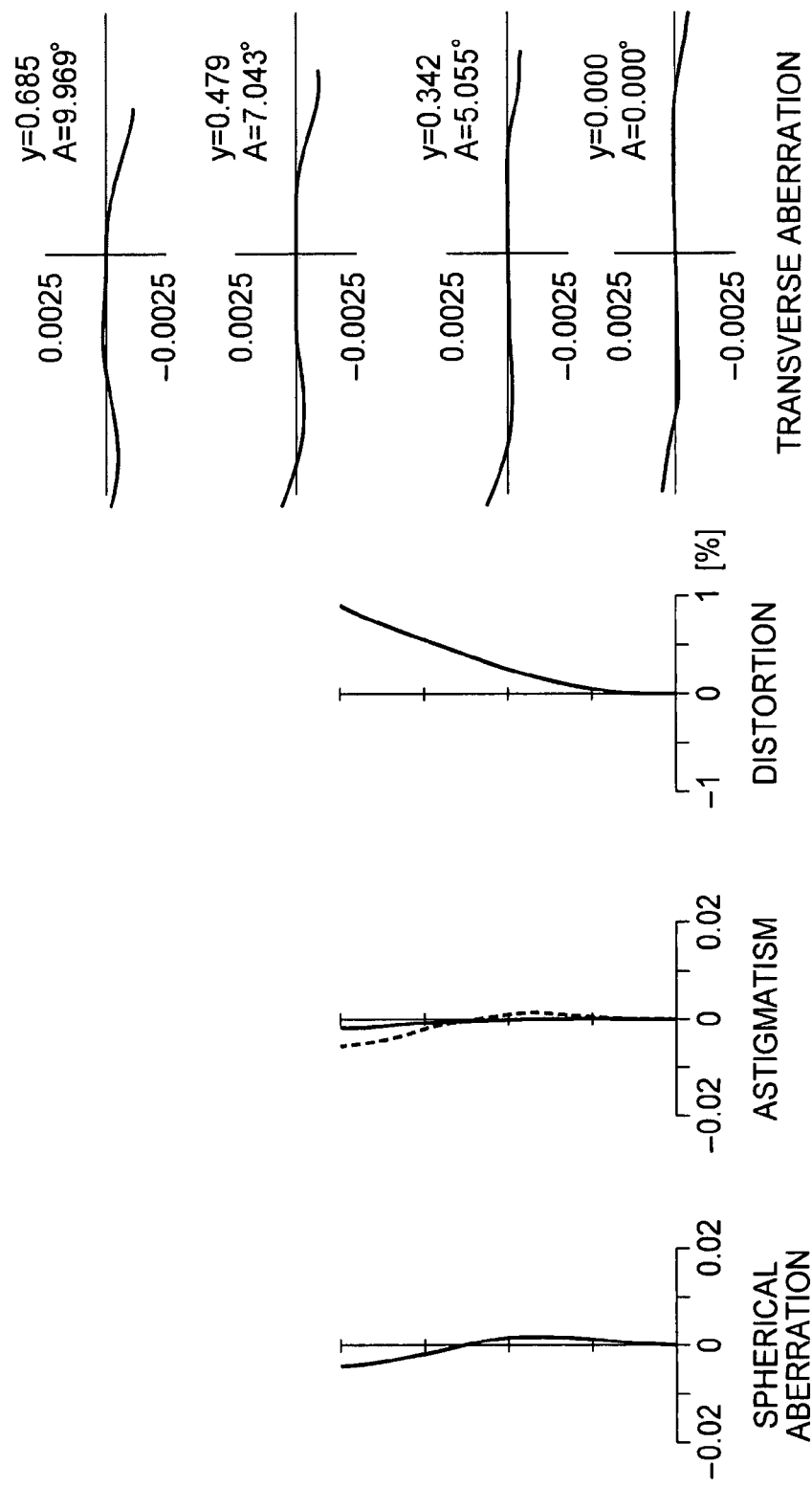
FIG. 11 illustrates the spherical aberration, astigmatism, distortion and transverse aberration in a second mid-focal length state.
Figure 12:
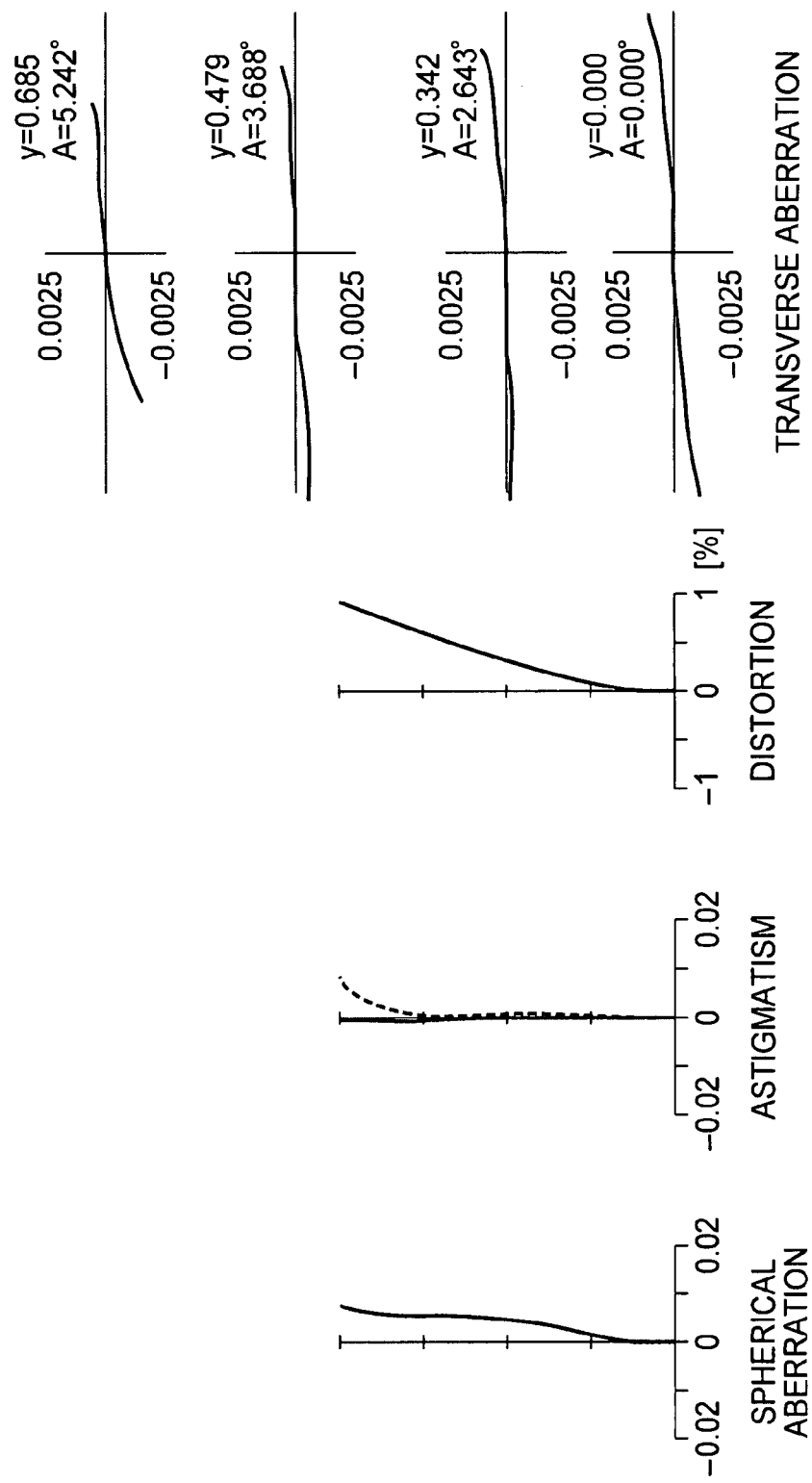
FIG. 12 illustrates the spherical aberration, astigmatism, distortion and transverse aberration in a third mid-focal length state.
Figure 13:
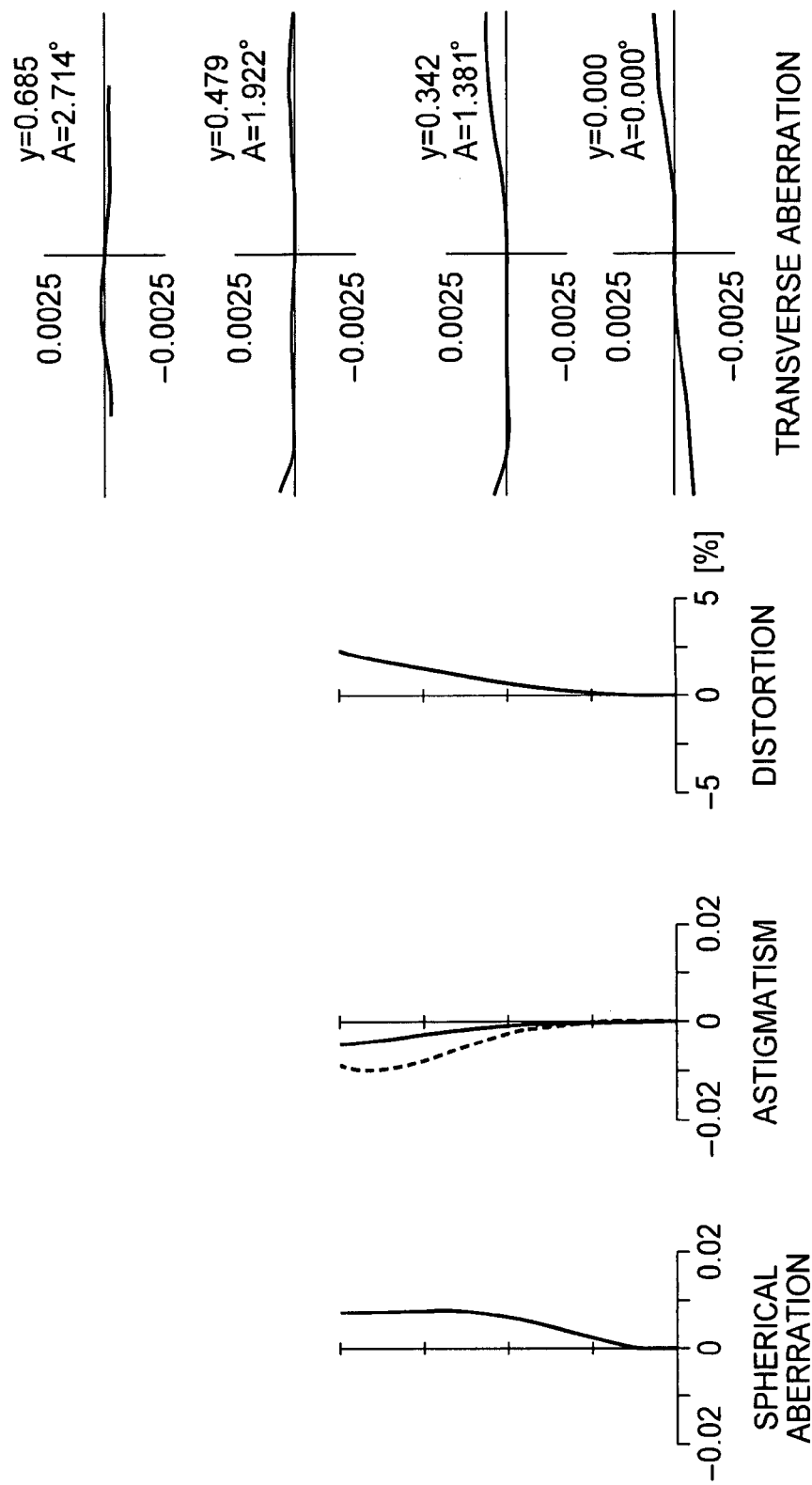
FIG. 13 illustrates the spherical aberration, astigmatism, distortion and transverse aberration in a telephoto end state.

FIGS. 9 through 13 show various aberration graphs for numerical embodiment 2 focused at infinity, where FIG. 9 is for the wide-angle end state (f=1.000), FIG. 10 is for a first mid-focal length state (f=1.977), FIG. 11 is for a second mid-focal length state (f=3.860), FIG. 12 is for a third mid-focal length state (f=7.395), and FIG. 13 is for the telephoto end state (f=14.105).

In the various aberration graphs in FIGS. 9 through 13, the solid line in the spherical aberration graphs indicates spherical aberration, the solid line in the astigmatism graphs

TABLE 6

| | | | | | |
|---|---|---|---|---|---|
| 7th Surface | κ = 0.000000 | A = −0.195289E-02 | B = +0.996592E-03 | C = −0.452079E-02 | D = +0.348160E-02 |
| 12th Surface | κ = 0.000000 | A = −0.691555E-02 | B = +0.384528E-02 | C = −0.598708E-02 | D = +0.329867E-02 |
| 15th Surface | κ = 0.000000 | A = −0.679746E-02 | B = −0.111337E-02 | C = +0.190339E-02 | D = −0.118063E-02 |
| 20th Surface | κ = 0.000000 | A = −0.111597E-01 | B = +0.318369E-02 | C = −0.371284E-02 | D = +0.116364E-02 | indicates the sagittal image plane while the broken line indicates the meridional image plane. In the transverse aberration graphs, A represents the angle of field, while y indicates the image height.

From these aberration graphs, it is obvious that various aberrations are well corrected for in numerical embodiment 2, and that numerical embodiment 2 is superior in terms of imaging performance.

Figure 14:
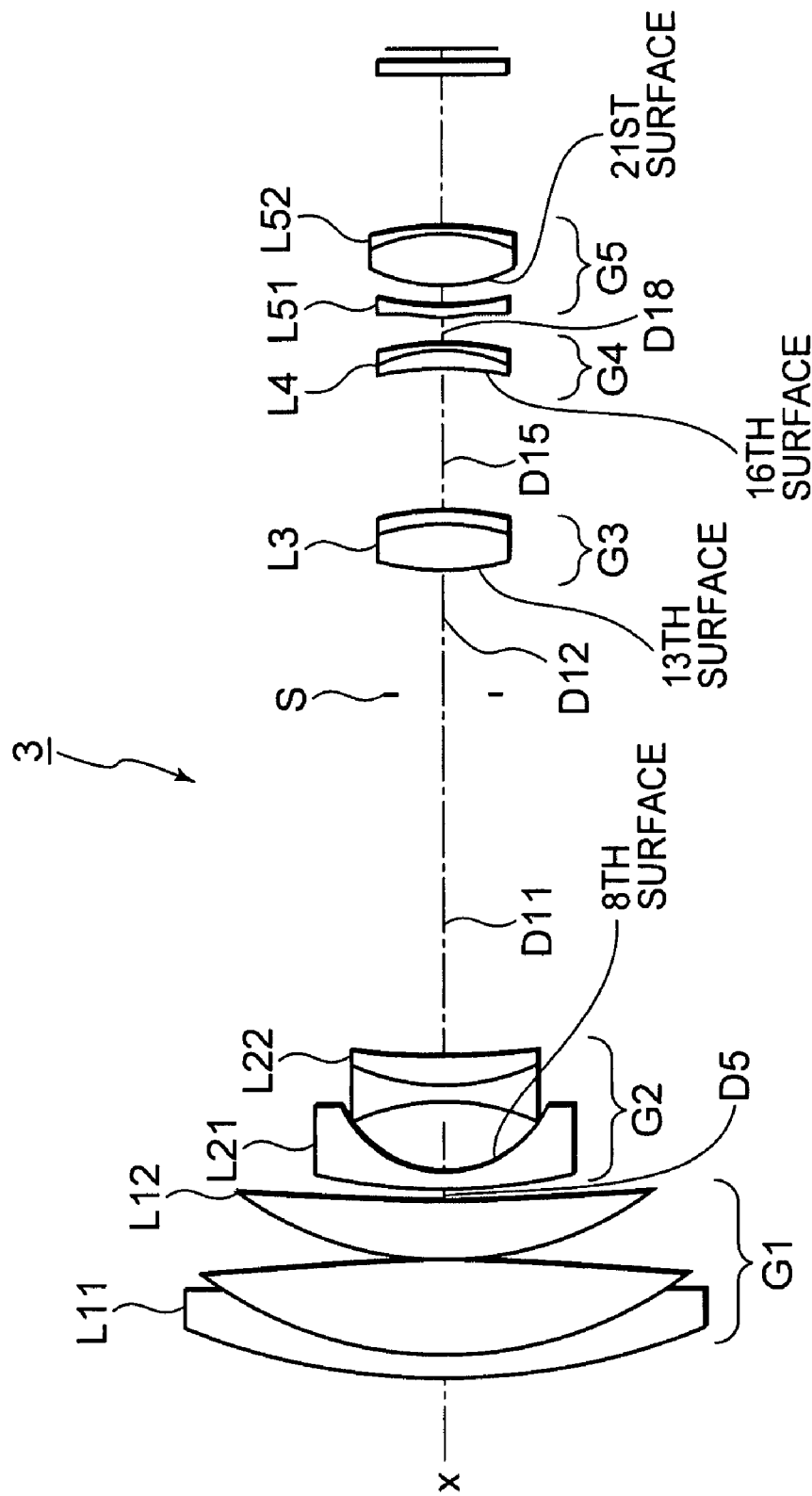
FIG. 14 illustrates the lens configuration for another embodiment of a variable focal length lens system according to the present invention.

FIG. 14 illustrates the lens configuration of a third embodiment 3 of a variable focal length lens system of the present invention. A first lens group G1 includes, in order and from the side of the object, a cemented lens L11, which is of a negative lens having a meniscus shape and whose convex surface is turned towards the object and a positive lens whose convex surface is turned towards the object, as well as a positive lens L12 whose convex surface is turned towards the object. A second lens group G2 includes, in order and from the side of the object, a negative lens L21 of a meniscus shape that has an aspherical surface on the image side and whose concave surface is turned towards the image, as well as a cemented negative lens L22, which is of a negative lens having a bi-concave shape and a positive lens of a meniscus shape and whose convex surface is turned towards the object. A third lens group G3 includes, in order and from the side of the object, a cemented positive lens L3, which is of a positive lens of a bi-convex shape and that has an aspherical surface on the object side and a negative lens of a meniscus shape and whose concave surface is turned towards the object. A fourth lens group G4 includes, in order and from the side of the object, a cemented lens L4, which is of a positive lens having a meniscus shape with an aspherical surface on the object side and whose concave surface is turned towards the object and a negative lens of a meniscus shape whose concave surface is turned towards the object. A fifth lens group G5 includes, in order and from the side of the object, a negative lens L51 of a meniscus shape whose concave surface is turned towards the image, and a cemented lens L52, which is of a positive lens of a bi-convex shape with an aspherical surface on the object side and a negative lens of a meniscus shape whose concave surface is turned towards the object. It is noted that there is an extremely thin resin layer on the image-side lens surface of the negative lens L21 in the second lens group G2, and that the image-side surface of this resin layer is aspherical. In addition, an aperture stop S is positioned between the second lens group G2 and the third lens group G3, and this aperture stop S moves in a direction x of the optical axis as the lens position state changes.

In table 9, the lens data of numerical embodiment 3, in which actual numerical values are applied to the above-mentioned third embodiment 3, are shown.

TABLE 9 f 1.00~2.05~4.24~7.39~14.10
FNO 2.86~3.26~3.64~3.70~4.61
2ω 71.67°~36.11°~18.01°~10.38°~5.42°

| SURFACE NUMBER | RADIUS OF CURVATURE | SURFACE GAP | REFRACTIVE INDEX | ABHE NUMBER | |
|---|---|---|---|---|---|
| 1: | 11.6243 | 0.276 | 1.90366 | 31.1 | |
| 2: | 5.9054 | 1.079 | 1.49700 | 81.6 | |
| 3: | −33.4114 | 0.038 | | | |
| 4: | 5.0031 | 0.729 | 1.60300 | 65.5 | |
| 5: | 20.9308 | (D5) | | | |
| 6: | 10.8446 | 0.133 | 1.88300 | 40.8 | |
| 7: | 1.4643 | 0.019 | 1.53420 | 41.7 | |
| 8: | 1.4648 | 0.921 | | | |
| 9: | −3.1331 | 0.114 | 1.48749 | 70.4 | |
| 10: | 2.0122 | 0.420 | 1.84666 | 23.8 | |
| 11: | 0.0000 | (D11) | | | |
| 12: | 0.0000 | (D12) | | | (Aperture Stop) |
| 13: | 4.0413 | 0.552 | 1.69350 | 53.3 | |
| 14: | −2.7308 | 0.114 | 1.75520 | 27.5 | |
| 15: | −6.2793 | (D15) | | | |
| 16: | −4.6751 | 0.257 | 1.58313 | 59.5 | |
| 17: | −1.8286 | 0.076 | 1.90366 | 31.1 | |
| 18: | −2.4194 | (D18) | | | |
| 19: | 23.8018 | 0.095 | 1.88300 | 40.8 | |
| 20: | 2.8535 | 0.293 | | | |
| 21: | 2.3568 | 0.666 | 1.58313 | 59.5 | |
| 22: | −2.3938 | 0.095 | 1.84666 | 23.8 | |
| 23: | −4.0070 | 1.866 | | | |
| 24: | 0.0000 | 0.095 | 1.51680 | 64.2 | |
| 25: | 0.0000 | (Bf) | | | |

The eighth, thirteenth, sixteenth and twenty-first surfaces are all aspherical. As such, the fourth- (A), sixth- (B), eighth- (C) and tenth-order (D) aspheric coefficients of these surfaces in numerical embodiment 3 are shown in table 10 along with their conic constants (κ).

TABLE 10

| | | | | | |
|---|---|---|---|---|---|
| 8th Surface | κ = 0.000000 | A = −0.434984E-03 | B = +0.572353E-02 | C = −0.126050E-01 | D = +0.978155E-02 |
| 19th Surface | κ = 0.000000 | A = −0.689014E-02 | B = +0.425011E-02 | C = −0.697951E-02 | D = +0.398211E-02 |
| 16th Surface | κ = 0.000000 | A = −0.755406E-02 | B = −0.208868E-02 | C = +0.370596E-02 | D = −0.231137E-02 |
| 21st Surface | κ = 0.000000 | A = −0.115363E-01 | B = +0.325661E-02 | C = −0.395446E-02 | D = +0.128002E-02 |

As the lens position state changes from the wide-angle end state to the telephoto end state, surface gap D5 between the first lens group G1 and the second lens group G2, surface gap D11 between the second lens group G2 and the aperture stop S, surface gap D12 between the aperture stop S and the third lens group G3, surface gap D15 between the third lens group G3 and the fourth lens group G4, and surface gap D18 between the fourth lens group G4 and the fifth lens group G5 change. As such, values for each of the above-mentioned surface gaps with respect to numerical embodiment 3 at the wide-angle end (f=1.000), three mid-focal lengths between the wide-angle end and the telephoto end (f=1.977), (f=3.860) and (f=7.394), and the telephoto end (f=14.105) are shown in table 11 along with the respective focal lengths f.

TABLE 11

(Variable Gap Table)

| f | 1.000 | 1.977 | 3.860 | 7.394 | 14.105 |
|---|---|---|---|---|---|
| D5 | 0.171 | 1.761 | 3.185 | 4.556 | 5.222 |
| D11 | 4.581 | 2.594 | 1.399 | 0.762 | 0.571 |
| D12 | 1.605 | 1.319 | 1.158 | 1.075 | 0.285 |
| D15 | 1.804 | 1.240 | 0.677 | 0.804 | 3.098 |
| D18 | 0.316 | 1.502 | 2.612 | 2.646 | 1.771 |
| Bf | 0.214 | 0.214 | 0.214 | 0.214 | 0.214 |

Corresponding values for conditional equations (1) through (8) with respect to numerical embodiment 3 are indicated in table 12.

TABLE 12 f2a = −1.928
f2b = −10.606
f35w = 0.278
(1) f2a/f2b = 0.182
(2) D12t/ft = 0.370
(3) n2P − n2N = 0.359
(4) β2w = −0.250
(5) β2t = −1.619
(6) Δ3/ft = 0.195
(7) fw/f35w = 0.278
(8) Dsw/TLw = 0.487

Figure 15:
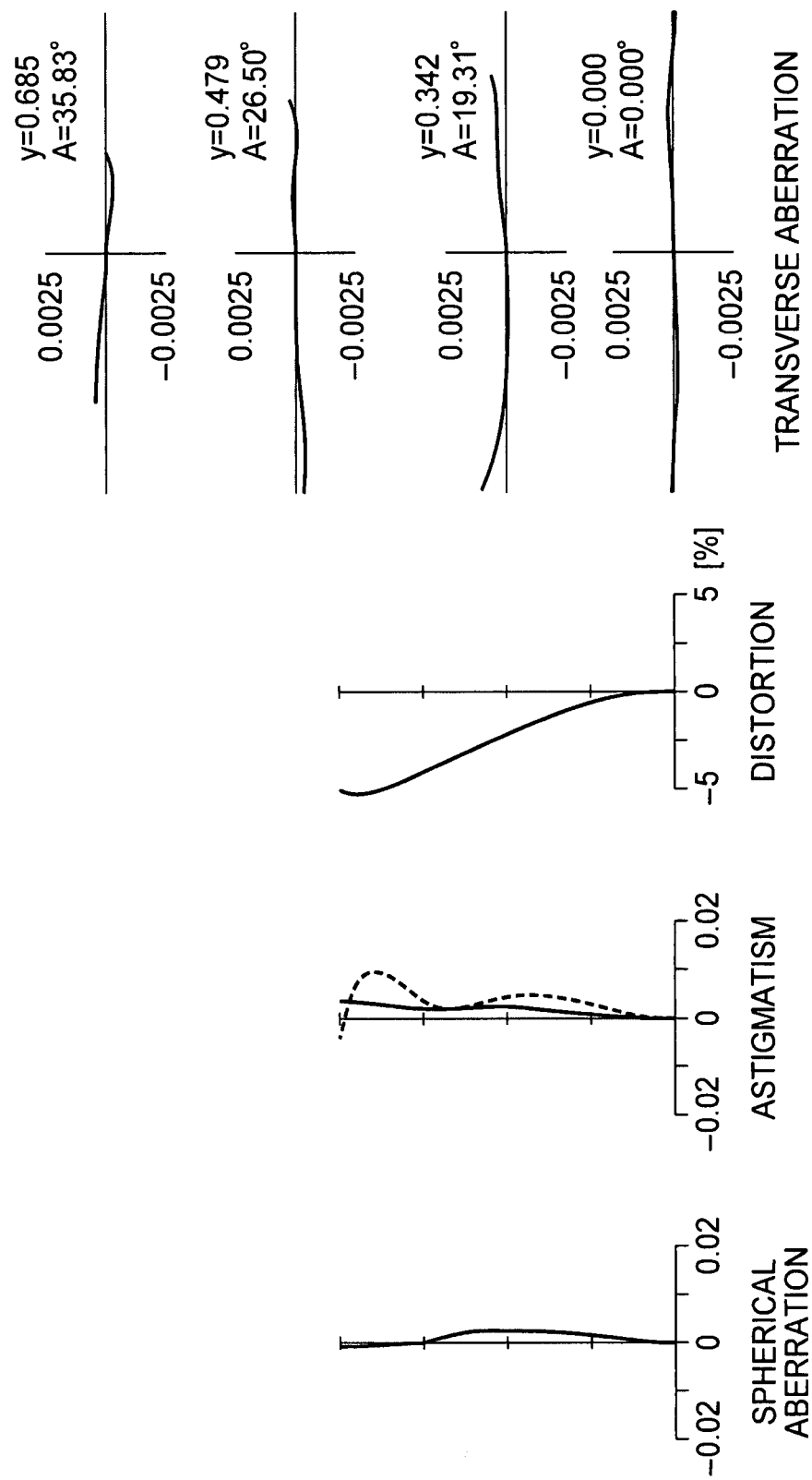
FIG. 15, along with FIGS. 16 through 19, shows various aberration graphs with respect to another numerical embodiment in which specific values are applied to the variable focal length lens system shown in FIG. 14, and the graphs in FIG. 15 illustrate the spherical aberration, astigmatism, distortion and transverse aberration in a wide-angle end state.
Figure 16:
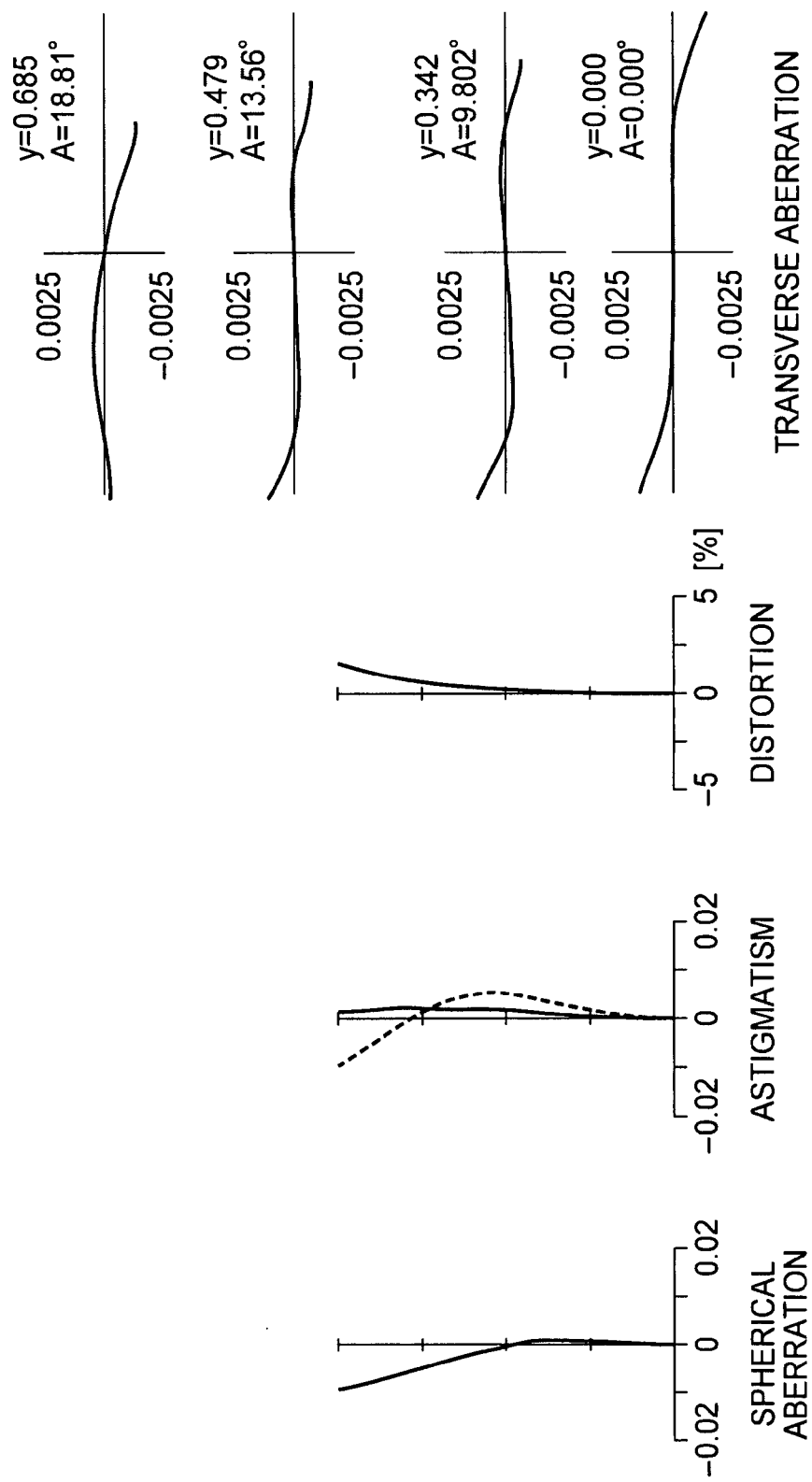
FIG. 16 illustrates the spherical aberration, astigmatism, distortion and transverse aberration in a first mid-focal length state.
Figure 17:
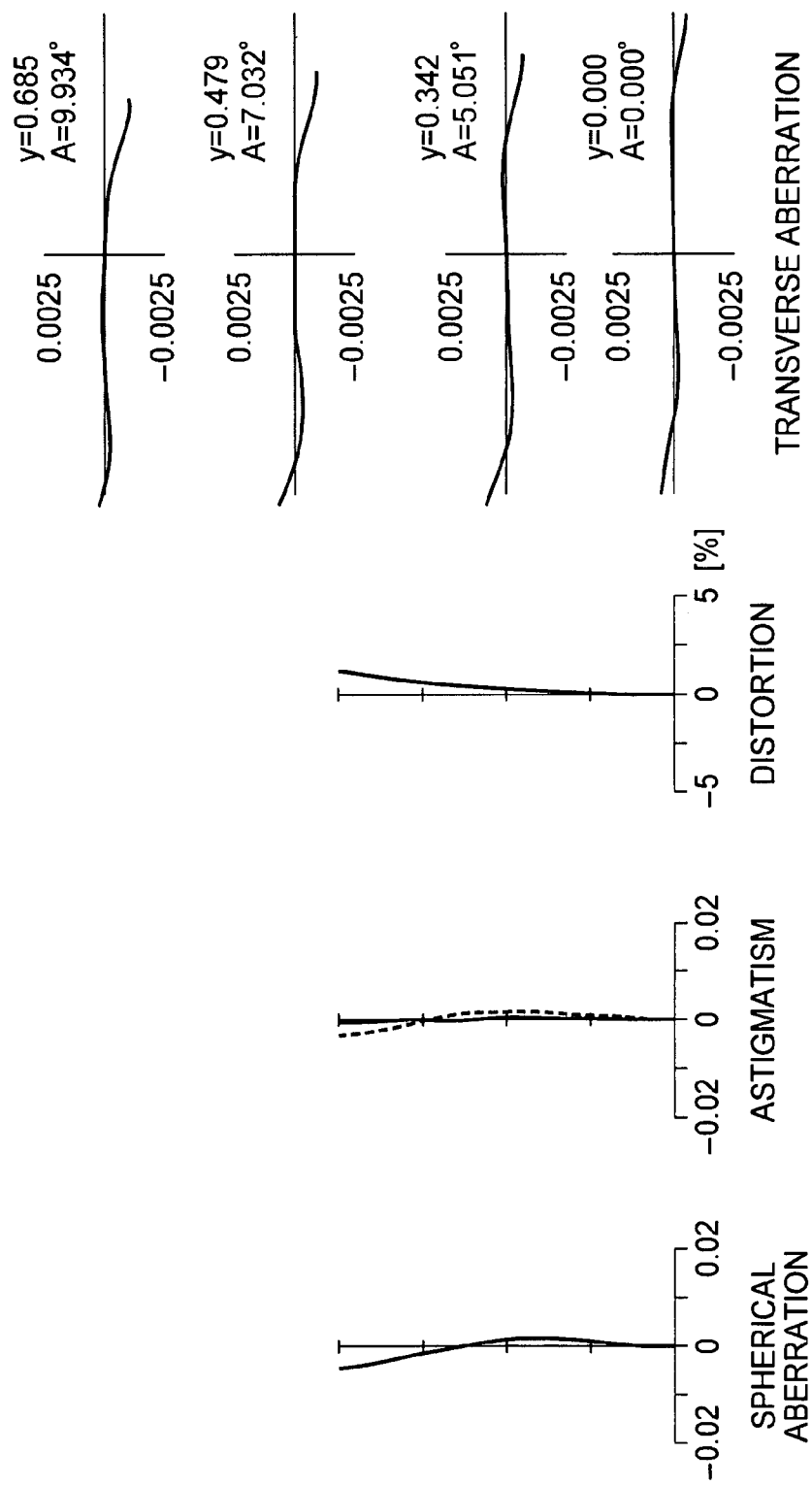
FIG. 17 illustrates the spherical aberration, astigmatism, distortion and transverse aberration in a second mid-focal length state.
Figure 18:
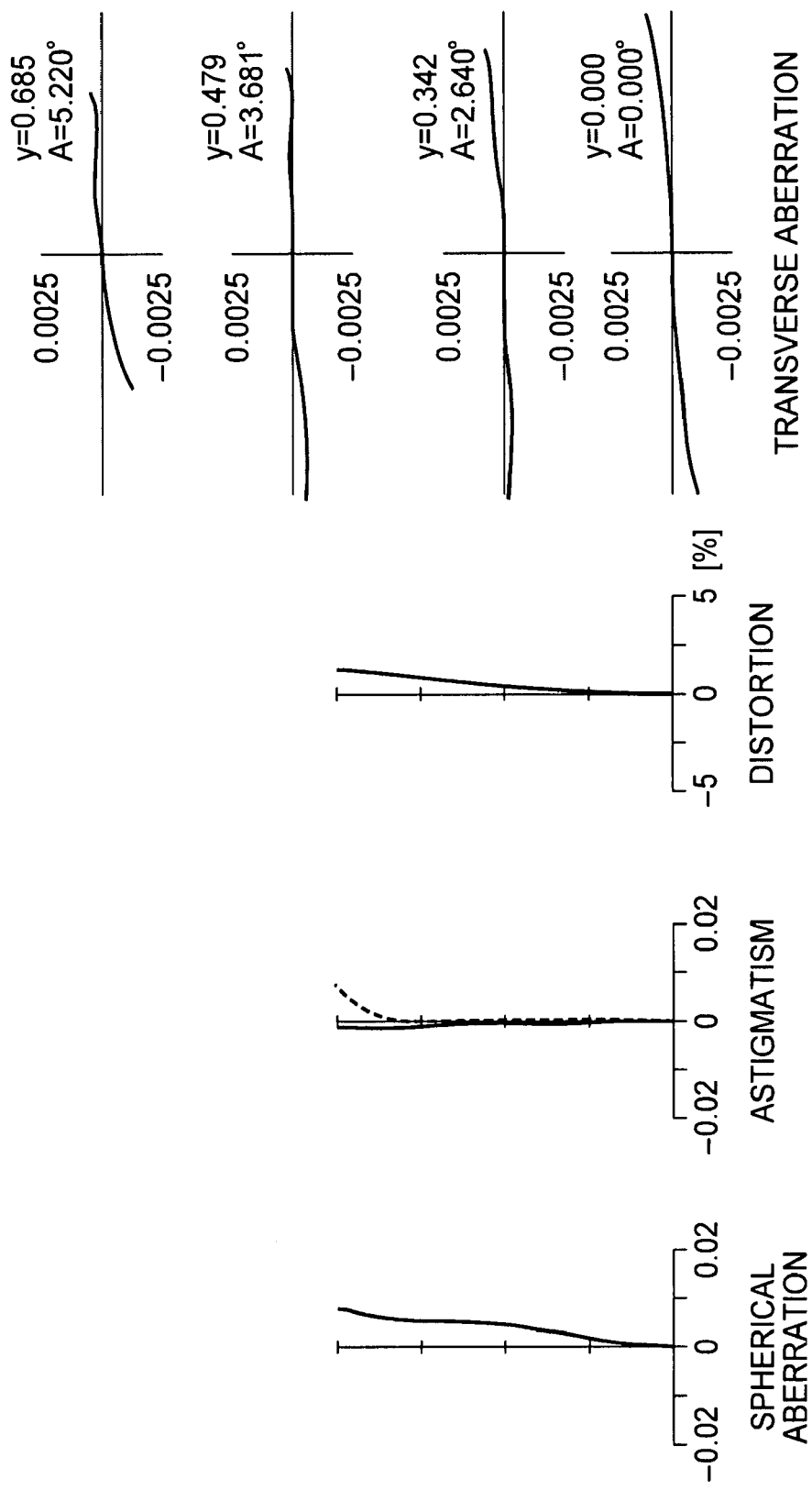
FIG. 18 illustrates the spherical aberration, astigmatism, distortion and transverse aberration in a third mid-focal length state.
Figure 19:
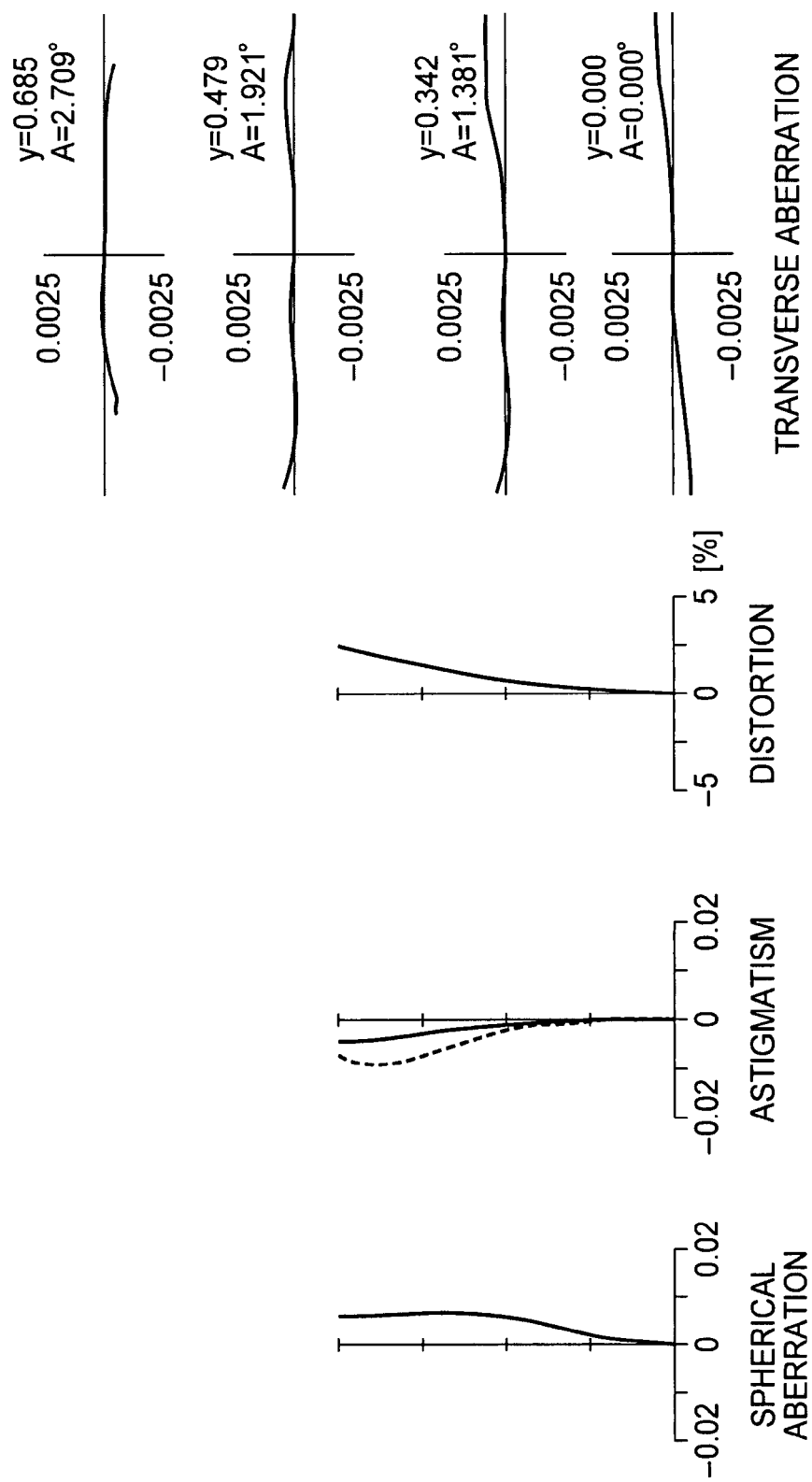
FIG. 19 illustrates the spherical aberration, astigmatism, distortion and transverse aberration in a telephoto end state.

FIGS. 15 through 19 show various aberration graphs for numerical embodiment 3 focused at infinity, where FIG. 15 is for the wide-angle end state (f=1.000), FIG. 16 is for a first mid-focal length state (f=1.977), FIG. 17 is for a second mid-focal length state (f=3.860), FIG. 18 is for a third mid-focal length state (f=7.394), and FIG. 19 is for the telephoto end state (f=14.105).

In the various aberration graphs in FIGS. 15 through 19, the solid line in the spherical aberration graphs indicates spherical aberration, the solid line in the astigmatism graphs indicates the sagittal image plane while the broken line indicates the meridional image plane. In the transverse aberration graphs, A represents the angle of field, while y indicates the image height.

From these aberration graphs, it is obvious that various aberrations are well corrected for in numerical embodiment 3, and that numerical embodiment 3 is superior in terms of imaging performance.

Figure 20:
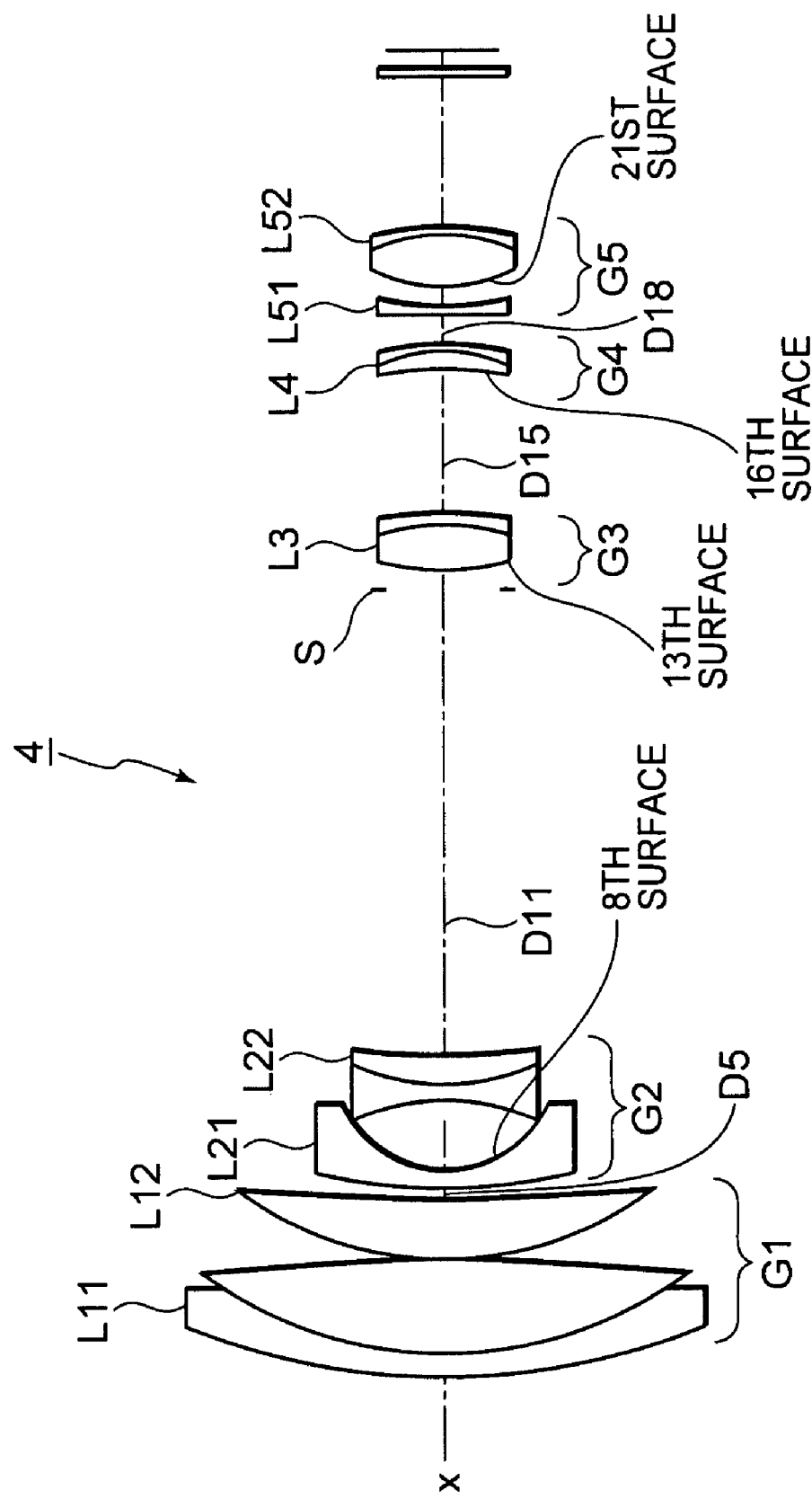
FIG. 20 illustrates the lens configuration for another embodiment of a variable focal length lens system according to the present invention.

FIG. 20 illustrates the lens configuration of a fourth embodiment 4 of a variable focal length lens system of the present invention. A first lens group G1 includes, in order and from the side of the object, a cemented lens L11, which is of a negative lens having a meniscus shape and whose convex surface is turned towards the object and a positive lens whose convex surface is turned towards the object, as well as a positive lens L12 whose convex surface is turned towards the object. A second lens group G2 includes, in order and from the side of the object, a negative lens L21 of a meniscus shape that has an aspherical surface on the image side and whose concave surface is turned towards the image, as well as a cemented negative lens L22, which is of a negative lens having a bi-concave shape and a positive lens of a meniscus shape and whose convex surface is turned towards the object. A third lens group G3 includes, in order and from the side of the object, a cemented positive lens L3, which is of a positive lens of a bi-convex shape and that has an aspherical surface on the object side and a negative lens of a meniscus shape and whose concave surface is turned towards the object. A fourth lens group G4 includes, in order and from the side of the object, a cemented lens L4, which is of a positive lens having a meniscus shape with an aspherical surface on the object side and whose concave surface is turned towards the object and a negative lens of a meniscus shape whose concave surface is turned towards the object. A fifth lens group G5 includes, in order and from the side of the object, a negative lens L51 of a meniscus shape whose concave surface is turned towards the image, and a cemented lens L52, which is of a positive lens of a bi-convex shape with an aspherical surface on the object side and a negative lens of a meniscus shape whose concave surface is turned towards the object. It is noted that there is an extremely thin resin layer on the image-side lens surface of the negative lens L21 in the second lens group G2, and that the image-side surface of this resin layer is aspherical. In addition, an aperture stop S is positioned in proximity to the third lens group G3 on its object side, and this aperture stop S moves in a direction x of the optical axis together with the third lens group G3 as the lens position state changes.

In table 13, the lens data of numerical embodiment 4, in which actual numerical values are applied to the above-mentioned fourth embodiment 4, are shown.

TABLE 13 f 1.00~2.05~4.24~7.39~14.10
FNO 2.86~3.21~3.59~3.65~4.04
2ω 71.67°~36.11°~19.86°~10.44°~5.42°

| SURFACE NUMBER | RADIUS OF CURVATURE | SURFACE GAP | REFRACTIVE INDEX | ABHE NUMBER | |
|---|---|---|---|---|---|
| 1: | 11.6243 | 0.276 | 1.90366 | 31.1 | |
| 2: | 5.9054 | 1.079 | 1.49700 | 81.6 | |
| 3: | −33.4114 | 0.038 | | | |
| 4: | 5.0031 | 0.729 | 1.60300 | 65.5 | |
| 5: | 20.9308 | (D5) | | | |
| 6: | 10.8446 | 0.133 | 1.88300 | 40.8 | |
| 7: | 1.4643 | 0.019 | 1.53420 | 41.7 | |
| 8: | 1.4648 | 0.921 | | | |
| 9: | −3.1331 | 0.114 | 1.48749 | 70.4 | |
| 10: | 2.0122 | 0.420 | 1.84666 | 23.8 | |
| 11: | 7.1401 | (D11) | | | |
| 12: | 0.0000 | 0.285 | | | (Aperture Stop) |
| 13: | 4.0413 | 0.552 | 1.69350 | 53.3 | |
| 14: | −2.7308 | 0.114 | 1.75520 | 27.5 | |
| 15: | −6.2793 | (D15) | | | |
| 16: | −4.6751 | 0.257 | 1.58313 | 59.5 | |
| 17: | −1.8286 | 0.076 | 1.90366 | 31.1 | |
| 18: | −2.4194 | (D18) | | | |
| 19: | 23.8018 | 0.095 | 1.88300 | 40.8 | |
| 20: | 2.8535 | 0.293 | | | |
| 21: | 2.3568 | 0.666 | 1.58313 | 59.5 | |
| 22: | −2.3938 | 0.095 | 1.84666 | 23.8 | |

TABLE 13-continued f 1.00~2.05~4.24~7.39~14.10
FNO 2.86~3.21~3.59~3.65~4.04
2ω 71.67°~36.11°~19.86°~10.44°~5.42°

| SURFACE NUMBER | RADIUS OF CURVATURE | SUR-FACE GAP | RE-FRACTIVE INDEX | ABHE NUMBER |
|---|---|---|---|---|
| 23: | −4.0070 | 1.866 | | |
| 24: | 0.0000 | 0.095 | 1.51680 | 64.2 |
| 25: | 0.0000 | (Bf) | | |

The eighth, thirteenth, sixteenth and twenty-first surfaces are all aspherical. As such, the fourth- (A), sixth- (B), eighth- (C) and tenth-order (D) aspheric coefficients of these surfaces in numerical embodiment 4 are shown in table 14 along with their conic constants (κ).

TABLE 14

| | | | | | |
|---|---|---|---|---|---|
| 8th Surface | κ = 0.000000 | A = −0.434984E−03 | B = +0.572353E−02 | C = −0.126050E−01 | D = +0.978155E−02 |
| 19th Surface | κ = 0.000000 | A = −0.689014E−02 | B = +0.425011E−02 | C = −0.697951E−02 | D = +0.398211E−02 |
| 16th Surface | κ = 0.000000 | A = −0.755406E−02 | B = −0.208868E−02 | C = +0.370596E−02 | D = −0.231137E−02 |
| 21st Surface | κ = 0.000000 | A = −0.115363E−01 | B = +0.325661E−02 | C = −0.395446E−02 | D = +0.128002E−02 |

As the lens position state changes from the wide-angle end state to the telephoto end state, surface gap D5 between the first lens group G1 and the second lens group G2, surface gap D11 between the second lens group G2 and the aperture stop S, surface gap D15 between the third lens group G3 and the fourth lens group G4, and surface gap D18 between the fourth lens group G4 and the fifth lens group G5 change. As such, values for each of the above-mentioned surface gaps with respect to numerical embodiment 4 at the wide-angle end (f=1.000), three mid-focal lengths between the wide-angle end and the telephoto end (f=1.977), (f=3.860) and (f=7.394), and the telephoto end (f=14.105) are shown in table 15 along with the respective focal lengths f.

TABLE 15

(Variable Gap Table)

| f | 1.000 | 1.977 | 3.860 | 7.394 | 14.105 |
|---|---|---|---|---|---|
| D5 | 0.171 | 1.761 | 3.185 | 4.556 | 5.222 |
| D11 | 4.581 | 2.594 | 1.399 | 0.762 | 0.571 |
| D15 | 1.804 | 1.240 | 0.677 | 0.804 | 3.098 |
| D18 | 0.316 | 1.502 | 2.612 | 2.646 | 1.771 |
| Bf | 0.214 | 0.214 | 0.214 | 0.214 | 0.214 |

Corresponding values for conditional equations (1) through (8) with respect to numerical embodiment 4 are indicated in table 16.

TABLE 16 f2a = −1.928
f2b = −10.606
f35w = 0.278
(1) f2a/f2b = 0.182
(2) D12t/ft = 0.370
(3) n2P − n2N = 0.359
(4) β2w = −0.250

TABLE 16-continued (5) β2t = −1.619
(6) Δ3/ft = 0.195
(7) fw/f35w = 0.278
(8) Dsw/TLw = 0.407

Figure 21:
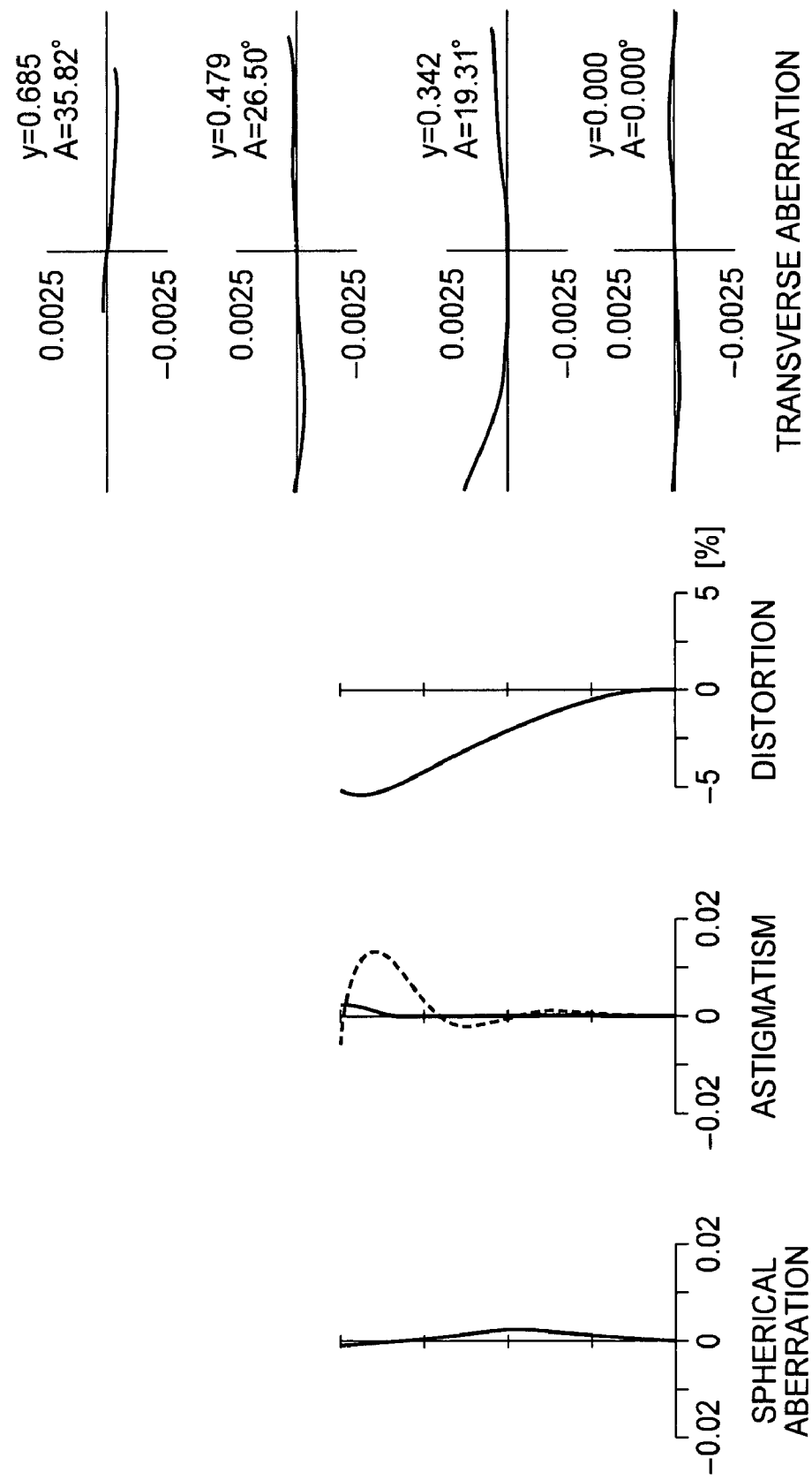
FIG. 21, along with FIGS. 22 through 25, shows various aberration graphs with respect to another numerical embodiment in which specific values are applied to the variable focal length lens system shown in FIG. 20, and the graphs in FIG. 21 illustrate the spherical aberration, astigmatism, distortion and transverse aberration in a wide-angle end state.
Figure 22:
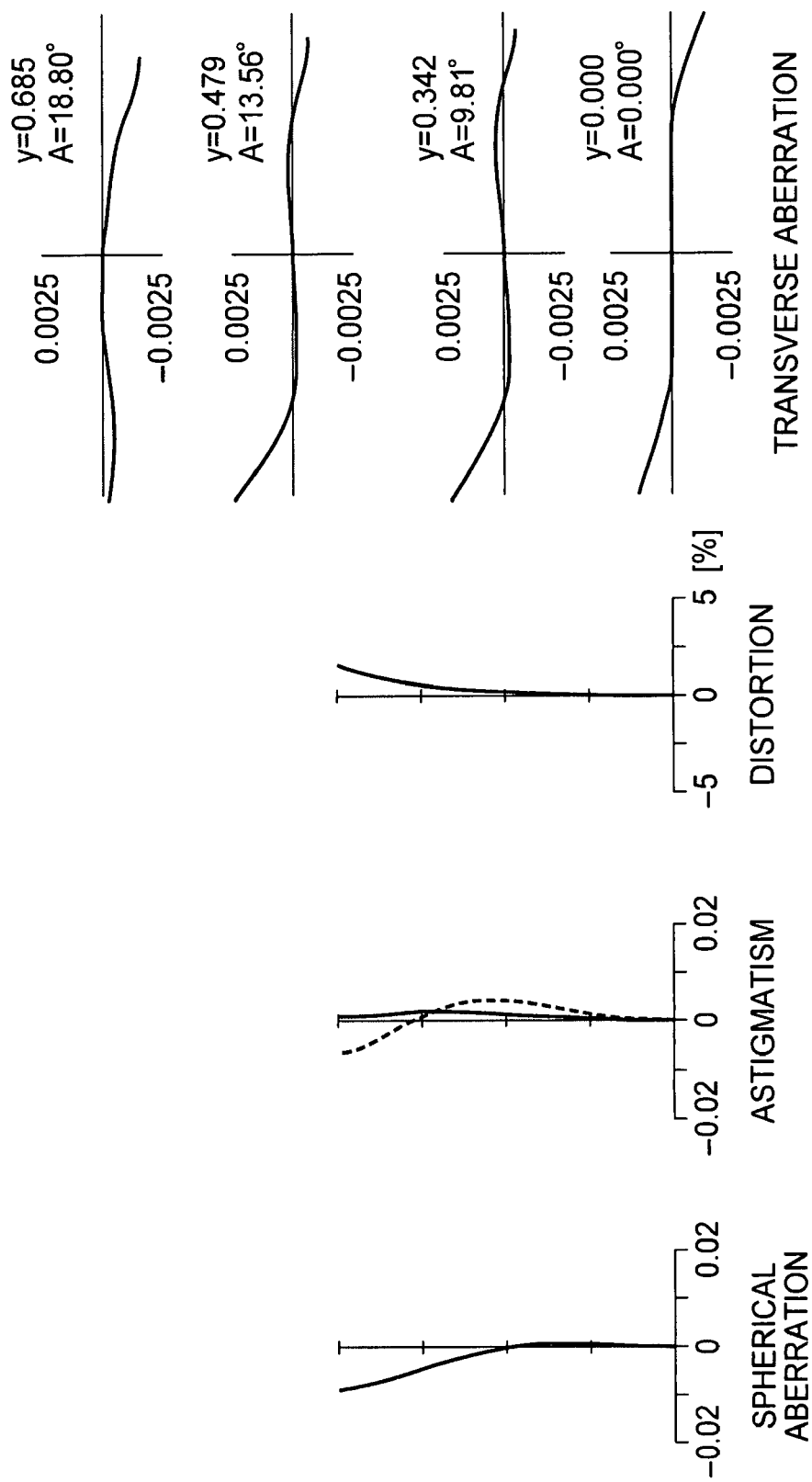
FIG. 22 illustrates the spherical aberration, astigmatism, distortion and transverse aberration in a first mid-focal length state.
Figure 23:
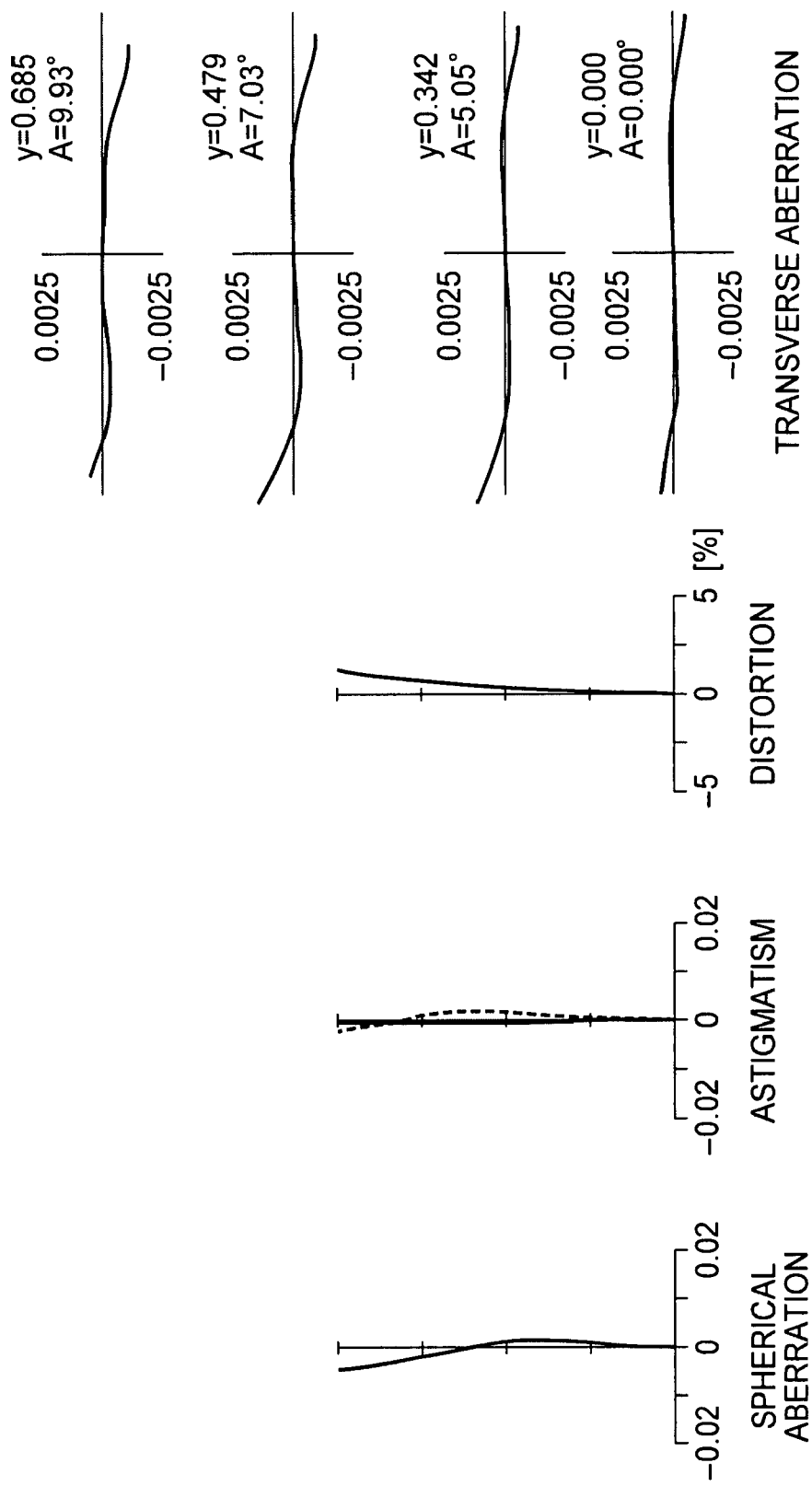
FIG. 23 illustrates the spherical aberration, astigmatism, distortion and transverse aberration in a second mid-focal length state.
Figure 24:
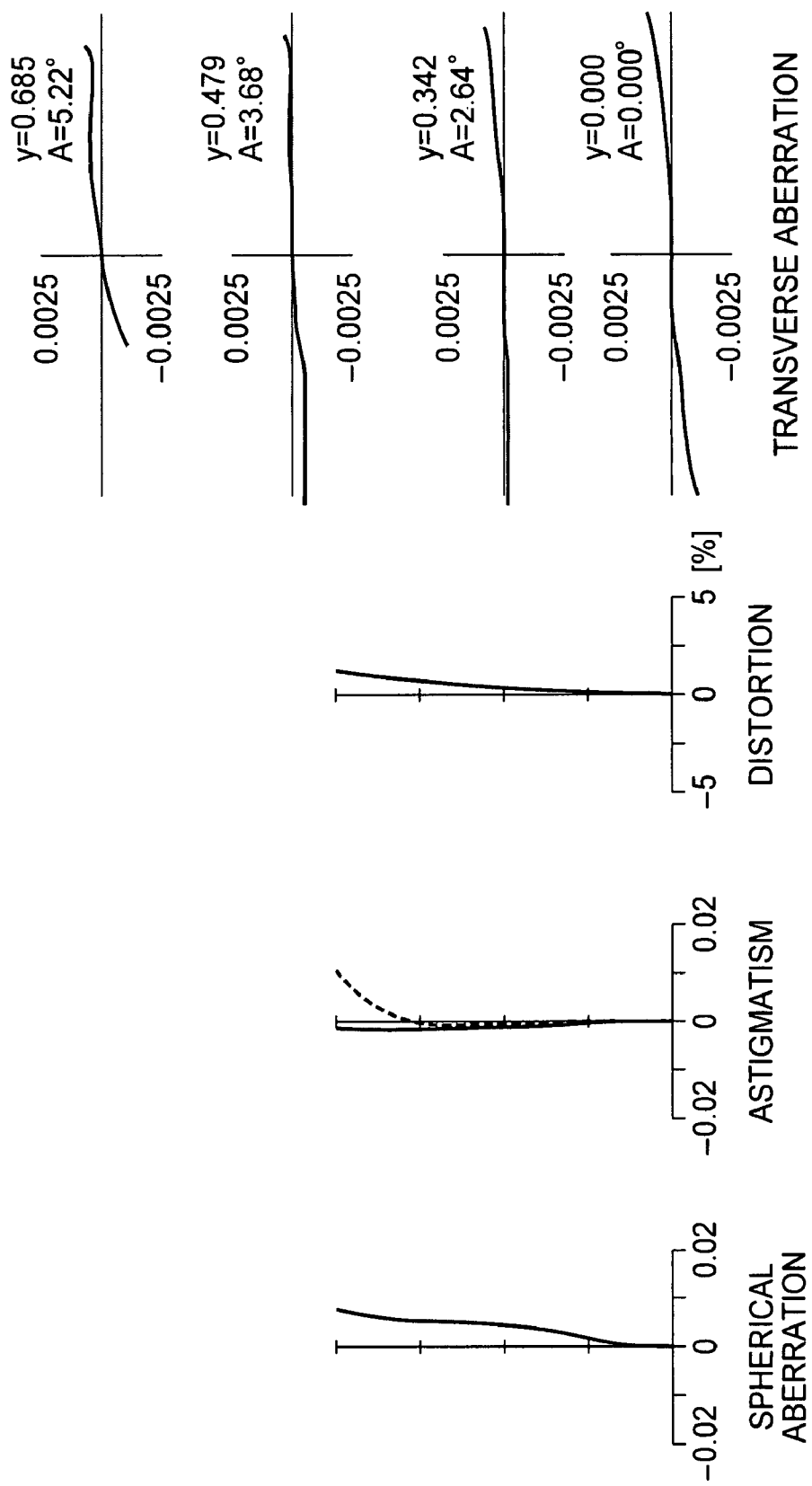
FIG. 24 illustrates the spherical aberration, astigmatism, distortion and transverse aberration in a third mid-focal length state.
Figure 25:
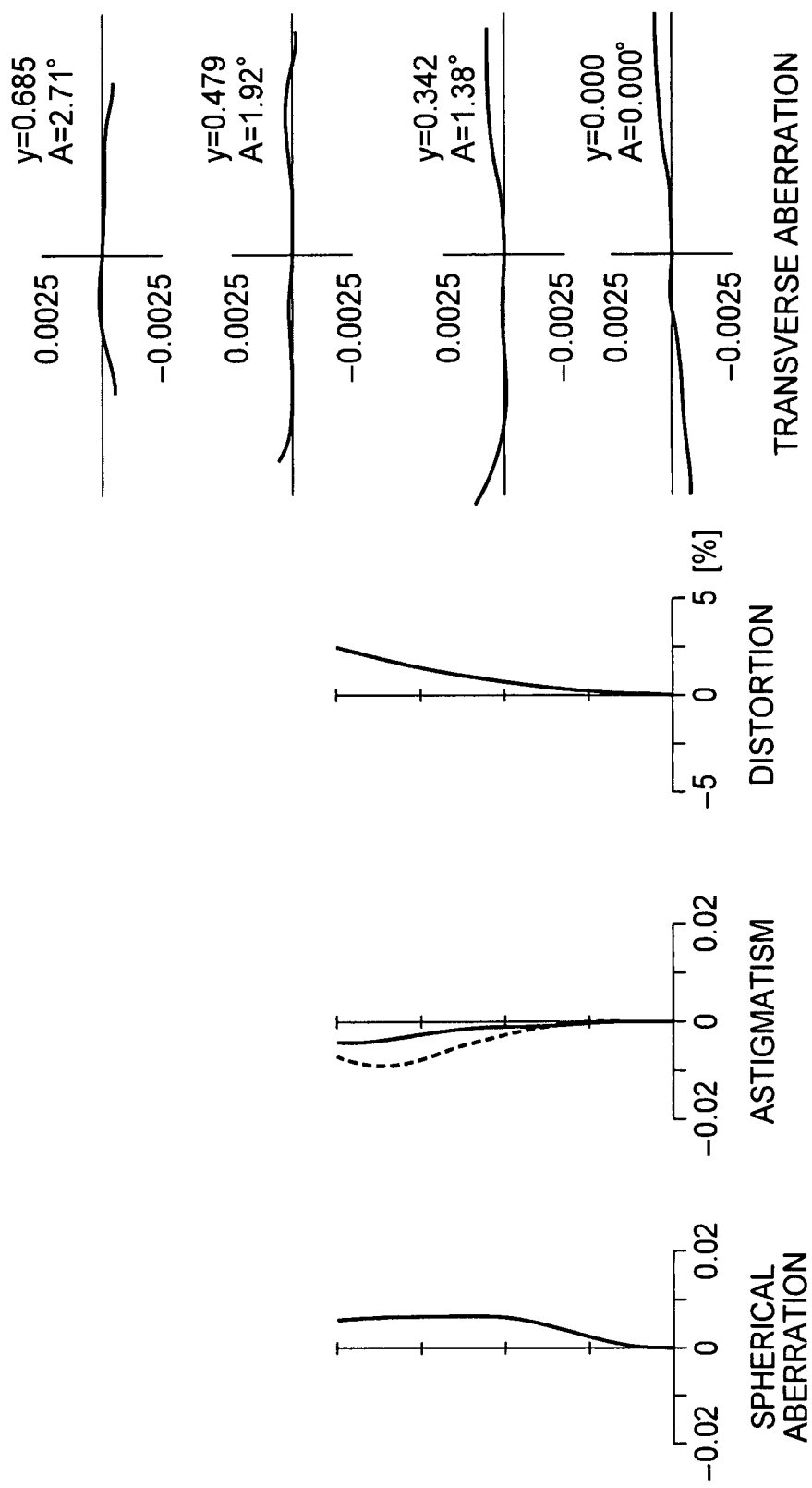
FIG. 25 illustrates the spherical aberration, astigmatism, distortion and transverse aberration in a telephoto end state.

FIGS. 21 through 25 show various aberration graphs for numerical embodiment 4 focused at infinity, where FIG. 21 is for the wide-angle end state (f=1.000), FIG. 22 is for a first mid-focal length state (f=1.977), FIG. 23 is for a second mid-focal length state (f=3.860), FIG. 24 is for a third mid-focal length state (f=7.394), and FIG. 25 is for the telephoto end state (f=14.105).

In the various aberration graphs in FIGS. 21 through 25, the solid line in the spherical aberration graphs indicates spherical aberration, the solid line in the astigmatism graphs indicates the sagittal image plane while the broken line indicates the meridional image plane. In the transverse aberration graphs, A represents the angle of field, while y indicates the image height.

From these aberration graphs, it is obvious that various aberrations are well corrected for in numerical embodiment 4, and that numerical embodiment 4 is superior in terms of imaging performance.

In the above-mentioned embodiments 1 to 4, if a configuration is adopted where the fifth lens group G5 is fixed in the direction of optical axis x but a partial parts group (for example, the positive parts group L52) in the fifth lens group G5 can be shifted in a direction that is perpendicular to optical axis x so as to shift the image, the transverse magnification of the positive parts group L52 in the fifth lens group G5 can be varied by moving the fifth lens group G5 in the direction of optical axis x, and the shift amount that is required for a correction by a predetermined angle can be brought closer between the telephoto end state and the wide-angle end state.

Figure 26:
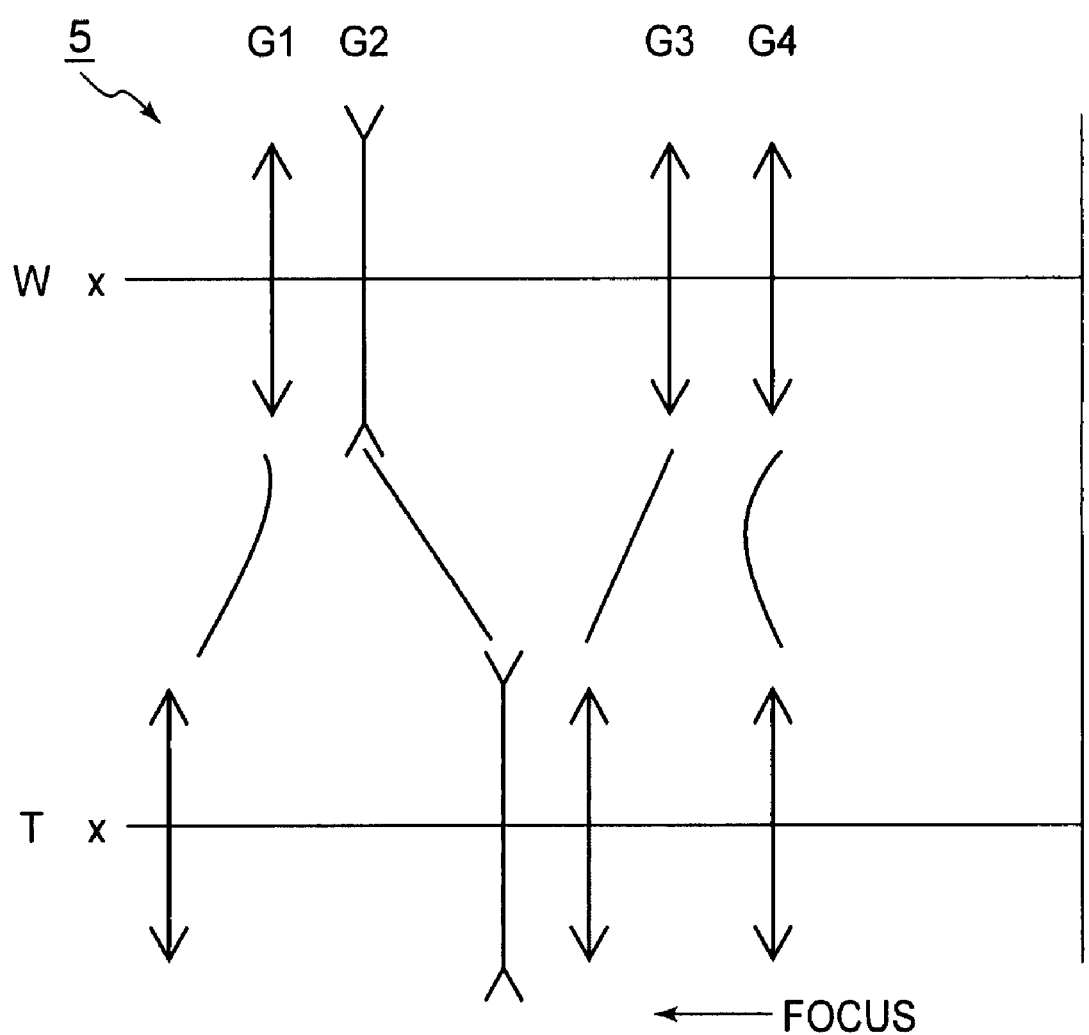
FIG. 26 is a schematic diagram illustrating the allocation of refractive power and the state of movement in relation to zooming in another embodiment of a variable focal length lens system of the present invention.

In addition to the above-mentioned first to fourth embodiments 1 to 4, a variable focal length lens system of the present invention may also be configured with the allocation of refractive power like the one shown in FIG. 26.

In other words, a variable focal length lens system 5 according to a fifth embodiment of the present invention includes, in order and from the side of the object, a first lens group G1 having a positive refractive power, a second lens group G2 having a negative refractive power, a third lens group G3 having a positive refractive power, and a fourth lens group G4 having a positive refractive power. In zooming from a wide-angle end state (the state shown on the upper side) to a telephoto end state (the state shown on the lower side), the first lens group through the fourth lens group move along an optical axis x in such a manner that the air gap between the first lens group G1 and the second lens group G2 widens, while the air gap between the second lens group G2 and the third lens group G3 narrows. Here, after first moving towards the image, the first lens group G1 then moves towards the object, while the second lens group G2 moves towards the image, the third lens group G3 moves towards the object, and the fourth lens group G4 moves so as to correct for changes in the position of the image plane that occur in association with the movements of each lens group while it also moves towards the object during close-range focusing.

Even with this fifth embodiment, it is still possible to reap the benefits of the present invention.

It is noted that, with respect to embodiments 1 through 5, it is naturally possible to provide a low pass filter in order to prevent occurrences of moire stripes on the image side of the lens system or to provide an infrared cut filter in accordance with the spectral sensitivity characteristics of the photoelectric transducers.

An imaging apparatus according to an embodiment of the present invention includes a variable focal length lens system, and an imaging device which converts an optical image formed by the above-mentioned variable focal length lens system into electric signals. The above-mentioned variable focal length lens system includes, in order and from the side of the object, a first lens group having a positive refractive power, a second lens group having a negative refractive power, a third lens group having a positive refractive power, and a fourth lens group having a positive refractive power. When the lens position changes from a wide-angle end state, where the focal length is shortest, to a telephoto end state, where the focal length is greatest, at least each of the lens groups from the above-mentioned first lens group to the above-mentioned fourth lens group is mobile, and the above-mentioned second lens group moves towards the image while the above-mentioned third lens group moves towards the object so that the gap between the above-mentioned first lens group and the above-mentioned second lens group grows bigger, while the gap between the above-mentioned second lens group and the above-mentioned third lens group becomes smaller. At the same time, the above-mentioned fourth lens group moves in the direction of the optical axis in order to compensate for changes in the position of the plane of the image that accompany the movement of each of the lens groups. The above-mentioned first lens group is positioned closer to the object in the telephoto end state as compared to the wide-angle end state. The second lens group includes, in order and from the side of the object, a negative lens of a meniscus shape having a concave surface and an aspherical surface on the image side, a cemented negative lens, which is of a biconcave lens and a positive lens of a meniscus shape that has its convex surface facing the object. In addition, the following conditional equations hold true: (1) $0.15<f2a/f2b<0.3$, and (2) $0.3<D12t/ft<0.45$. Thus, with an imaging apparatus of the present embodiment, while keeping itself small, it is possible to achieve imaging with a high zoom ratio.

Figure 27:
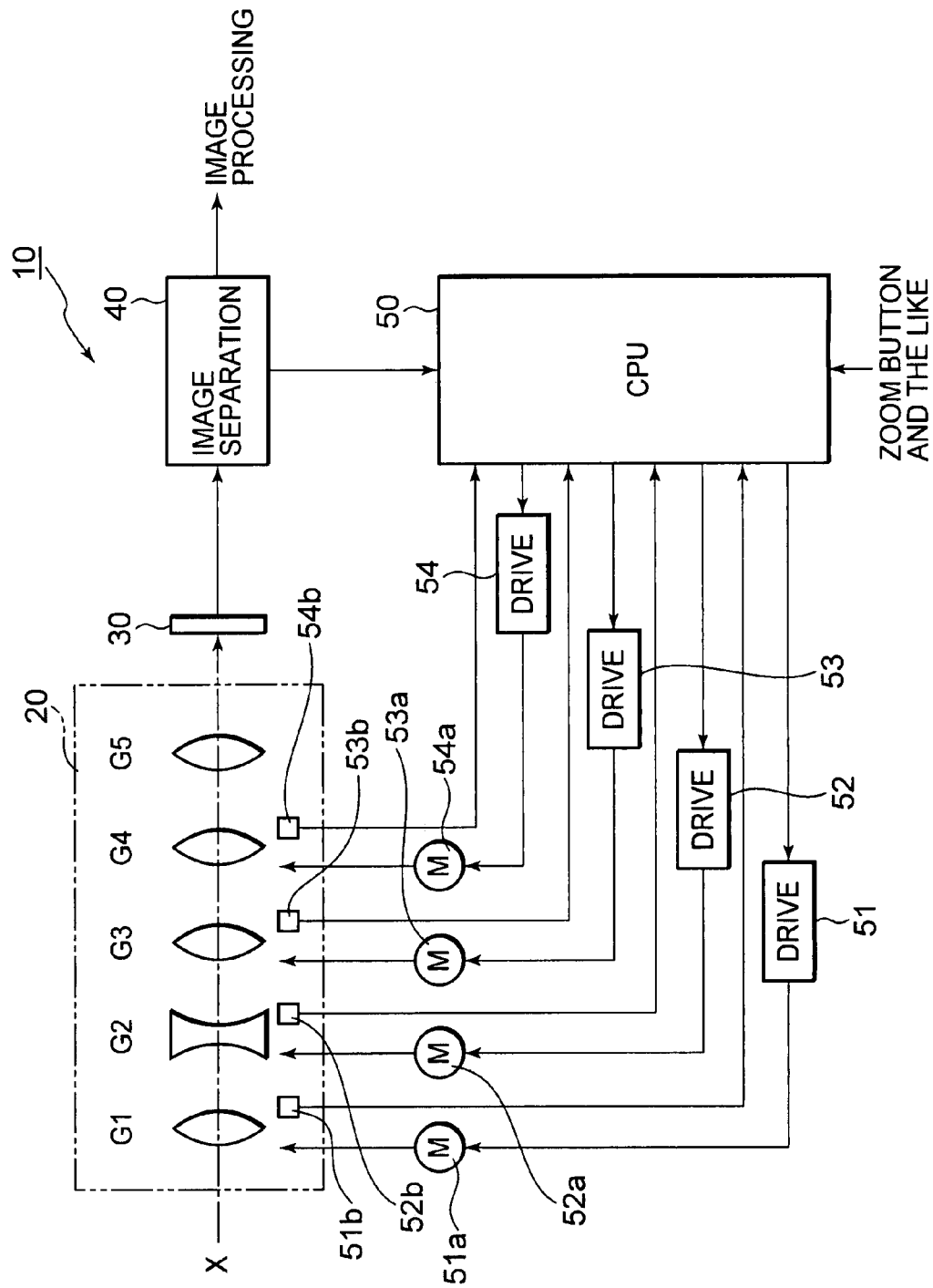
FIG. 27 is a block diagram illustrating an embodiment of an imaging apparatus of the present invention.

FIG. 27 is a block diagram illustrating a specific embodiment of an imaging apparatus of the present invention.

An imaging apparatus 10 includes a variable focal length lens system 20, and an imaging device 30 which converts an optical image formed by the above-mentioned variable focal length lens system 20 into electric signals. As examples of the imaging device 30, such photoelectric transducers as CCDs (Charge Coupled Devices) and CMOSs (Complementary Metal-Oxide Semiconductors) and the like may be used. For the above-mentioned variable focal length lens system 20, a variable focal length lens system according to the present embodiment may be used, and in FIG. 27, a variable focal length lens system 1 according to the first embodiment shown in FIG. 1 is illustrated in a simplified manner where each of the lens groups is shown as a single lens. Naturally, in addition to the variable focal length lens system 1 according to the first embodiment, variable focal length lens systems 2 through 5 according to the second through fifth embodiments, or a variable focal length lens system of the present invention configured in a manner that is different from those disclosed in the present specification may also be used.

Electric signals formed by the above-mentioned imaging device 30 are sent to a control circuit 50 as focus control signals by an image separation circuit 40, and image signals are sent to an image processing circuit. Signals sent to the image processing circuit are processed to a state that is suitable for subsequent processing, and are provided to various processes such as displaying by a display apparatus, recording to a recording medium, transferring by communications means and the like.

External operation signals, such as operations through a zoom button and the like, for example, are inputted to the control circuit 50, and various processes are performed in accordance with these operation signals. For example, if a zoom command by way of the zoom button is inputted, in order to realize the focal length state that is commanded, drive sections 51a, 52a, 53a and 54a are made to operate via driver circuits 51, 52, 53 and 54, thereby moving the first lens group G1, the second lens group G2, the third lens group G3 and the fourth lens group G4 to predetermined positions. Positional information regarding the first lens group G1, the second lens group G2, the third lens group G3 and the fourth lens group G4 obtained through respective sensors 51b, 52b, 53b and 54b is inputted to the control circuit 50, and a referred to in outputting command signals to the driver circuits 51, 52, 53 and 54. In addition, the control circuit 50 checks the focus state based on signals sent from the above-mentioned image separation circuit 40, and controls, for example, the fourth lens group G4 via the driver circuit 54 in order to obtain the optimal focus state.

The above-mentioned imaging apparatus 10 may be applied to various products. For example, it may be applied widely to various cameras, such as digital still cameras, digital video cameras and the like, or as the camera section of digital devices such as mobile phones into which cameras are incorporated or PDAs (Personal Digital Assistants) into which cameras are incorporated.

It is noted that the application of a zoom lens of the present invention is by no means limited to digital cameras, and that it may of course be applied to, for example, cameras that use silver salt films as media.

In addition, the specific forms and structures of the various parts and the numerical values indicated in the embodiments and numerical embodiments described herein are merely examples for implementing the present invention, and the scope of the invention should in no way be limited thereby.

What is claimed is:

1. A variable focal length lens system, comprising, in order and from an object side:
   a first lens group having a positive refractive power;
   a second lens group having a negative refractive power;
   a third lens group having a positive refractive power; and
   a fourth lens group having a positive refractive power,
      wherein
   as the lens position state changes from a wide-angle end state, where a focal length is shortest, to a telephoto end state, where the focal length is longest, at least each of the lens groups from the first lens group through the fourth lens group is mobile, the second lens group moves towards an image side and the third lens group moves towards the object side in such a manner that a gap between the first lens group and the second lens group increases, and a gap between the second lens group and the third lens group decreases, while the fourth lens group moves in a direction of an optical axis so as to compensate for changes in a position of an image plane which accompany movements of each of the lens group, the first lens group is closer to the object in the telephoto end state as compared to the wide-angle end state, the second lens group includes, in order and from the object side, a negative lens of a meniscus shape having a concave surface and an aspheric surface on the image side, and a cemented negative lens of a bi-concave lens and a positive lens of a meniscus shape and whose convex surface is turned towards the object, and following conditional equations (1) and (2) are satisfied:

$$0.15 < f2a/f2b < 0.3; \text{ and} \quad (1)$$

$$0.3 < D12t/ft < 0.45, \text{ where} \quad (2)$$

f2a is a focal length of the negative lens placed within the second lens group, f2b is a focal length of the cemented negative lens placed within the second lens group, D12t is a gap between the first lens group and the second lens group in the telephoto end state, and ft is a focal length of the overall lens system in the telephoto end state.

2. The variable focal length lens system according to claim 1, wherein a following conditional equation (3) is satisfied:

$$0.3 < n2P - n2N, \text{ where} \quad (3)$$

n2N is a refractive index of, with respect to d-line, the negative lens in the cemented negative lens within the second lens group, and n2P is a refractive index of, with respect to the d-line, the positive lens in the cemented negative lens within the second lens group.

3. The variable focal length lens system according to claim 1, wherein the fourth lens group moves in the direction of the optical axis in close-range focusing, and following conditional equations (4) and (5) are satisfied:

$$-1 < 2w < 0 \quad (4)$$

$$\beta 2t < -1, \text{ where} \quad (5)$$

β2w is a transverse magnification of the second lens group in the wide-angle end state, and β2t is a transverse magnification of the second lens group in the telephoto end state.

4. The variable focal length lens system according to claim 3, wherein a following conditional equation (6) is satisfied:

$$0.17 < \Delta 3/ft < 0.25, \text{ where} \quad (6)$$

Δ3 is an amount of movement of the third lens group when the lens position state changes from the wide-angle end state to the telephoto end state.

5. The variable focal length lens system according to claim 1, further comprising a fifth lens group on the image side of the fourth lens group, wherein the fifth lens group includes a negative parts group having a negative refractive power, and a positive parts group having a positive refractive power and which is positioned on the image side of the negative parts group with an air gap in between.

6. The variable focal length lens system according to claim 5, wherein the fifth lens group is fixed in the direction of the optical axis when the lens position state changes.

7. The variable focal length lens system according to claim 6, wherein the third lens group includes a cemented positive lens, which is of a positive lens and a negative lens.

8. The variable focal length lens system according to claim 5, wherein the following conditional equation (7) is satisfied:

$$0.25 < fw/f35w < 0.3, \text{ where} \quad (7)$$

fw is a focal length of the overall lens system in the wide-angle end state, and f35w is a combined focal length of the third lens group through the fifth lens group in the wide-angle end state.

9. The variable focal length lens system according to claim 6, wherein the following conditional equation (7) is satisfied:

$$0.25 < fw/f35w < 0.3, \text{ where} \quad (7)$$

fw is a focal length of the overall lens system in the wide-angle end state, and f35w is a combined focal length of the third lens group through the fifth lens group in the wide-angle end state.

10. The variable focal length lens system according to claim 7, wherein the following conditional equation (7) is satisfied:

$$0.25 < fw/f35w < 0.3, \text{ where} \quad (7)$$

fw is a focal length of the overall lens system in the wide-angle end state, and f35w is a combined focal length of the third lens group through the fifth lens group in the wide-angle end state.

11. The variable focal length lens system according to claim 8, wherein a following conditional equation (8) is satisfied:

$$0.4 < Dsw/TLw < 0.55, \text{ where} \quad (8)$$

Dsw is a distance between a aperture stop and the image plane in the wide-angle end state, and TLw is an entire lens length in the wide-angle end state.

12. An imaging apparatus, comprising:

a variable focal length lens system; and an imaging device that converts an optical image formed by the variable focal length lens system into electric signals, wherein the variable focal length lens system includes, in order and from an object side:

a first lens group having a positive refractive power;

a second lens group having a negative refractive power;

a third lens group having a positive refractive power; and a fourth lens group having a positive refractive power, wherein as the lens position state changes from a wide-angle end state, where a focal length is shortest, to a telephoto end state, where the focal length is longest, at least each of the lens groups from the first lens group through the fourth lens group is mobile, the second lens group moves towards an image side and the third lens group moves towards the object side in such a manner that a gap between the first lens group and the second lens group increases, and a gap between the second lens group and the third lens group decreases, while the fourth lens group moves in a direction of an optical axis so as to compensate for changes in a position of an image plane which accompany movements of each of the lens group, the first lens group is closer to the object in the telephoto end state as compared to the wide-angle end state, the second lens group includes, in order and from the object side, a negative lens of a meniscus shape having a concave surface and an aspheric surface on the image side, and a cemented negative lens of a bi-concave lens and a positive lens of a meniscus shape and whose convex surface is turned towards the object, and following conditional equations (1) and (2) are satisfied:

$$0.15 < f2a/f2b < 0.3; \text{ and} \qquad (1)$$

$$0.3 < D12t/ft < 0.45, \text{ where} \qquad (2)$$

f2a is a focal length of the negative lens placed within the second lens group, f2b is a focal length of the cemented negative lens placed within the second lens group, D12t is a gap between the first lens group and the second lens group in the telephoto end state, and ft is a focal length of the overall lens system in the telephoto end state.

* * * * *

UNITED STATES PATENT AND TRADEMARK OFFICE
CERTIFICATE OF CORRECTION

PATENT NO. : 7,286,304 B1  Page 1 of 1
APPLICATION NO. : 11/783797
DATED : October 23, 2007
INVENTOR(S) : Motoyuki Ohtake It is certified that error appears in the above-identified patent and that said Letters Patent is hereby corrected as shown below:

Column 29, Line 50 Claim 3:
"-1<2w<0" should read -- $-1<\beta 2w<0$ --.

Signed and Sealed this

Twenty-seventh Day of May, 2008

JON W. DUDAS
*Director of the United States Patent and Trademark Office*